US012495310B2

(12) United States Patent
Niemelä et al.

(10) Patent No.: US 12,495,310 B2
(45) Date of Patent: Dec. 9, 2025

(54) CELL SITE AUXILIARY EQUIPMENT CONTROL

(71) Applicant: NOKIA SOLUTIONS AND NETWORKS OY, Espoo (FI)

(72) Inventors: Tuomas Niemelä, Helsinki (FI); Seppo Olavi Hämäläinen, Helsinki (FI); Olli Pekka Salmela, Helsinki (FI); Topi Tuomas Volkov, Kantvik (FI); Henri Jonni Koskela, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 352 days.

(21) Appl. No.: 18/115,524

(22) Filed: Feb. 28, 2023

(65) Prior Publication Data

US 2023/0276253 A1  Aug. 31, 2023

(30) Foreign Application Priority Data

Feb. 28, 2022 (FI) .................................. 20225184
Sep. 30, 2022 (FI) .................................. 20225880

(51) Int. Cl.
*H04W 28/18* (2009.01)
*H04W 16/22* (2009.01)
(Continued)

(52) U.S. Cl.
CPC ........... *H04W 16/22* (2013.01); *H04W 24/10* (2013.01); *H04W 52/0209* (2013.01)

(58) Field of Classification Search
CPC .. H04W 16/22; H04W 24/10; H04W 52/0209
(Continued)

(56) References Cited

U.S. PATENT DOCUMENTS 11,134,402 B1 * 9/2021 Boyapati ............... H01M 10/48
2009/0006010 A1   1/2009 Van Sloun et al.
(Continued)

FOREIGN PATENT DOCUMENTS

CN    107658960 A    2/2018
CN    114073139 A    2/2022
(Continued)

OTHER PUBLICATIONS

Finnish Office Action corresponding to FI Appln. No. 20225880, dated Jan. 12, 2023.
(Continued)

*Primary Examiner* — Faisal Choudhury
(74) *Attorney, Agent, or Firm* — SQUIRE PATTON BOGGS (US) LLP

(57) ABSTRACT

Disclosed is a method comprising receiving measurement information associated with cell site auxiliary equipment, wherein the measurement information comprises at least one of the following: status metrics or performance metrics associated with the cell site auxiliary equipment; determining, based at least partly on the measurement information, one or more commands for controlling one or more functions of the cell site auxiliary equipment; and transmitting the one or more commands to the cell site auxiliary equipment, wherein an E2 interface is used for at least one of the following: receiving at least a part of the measurement information, or transmitting the one or more commands.

14 Claims, 13 Drawing Sheets

(51) Int. Cl.
  *H04W 24/10* (2009.01)
  *H04W 52/02* (2009.01)
(58) Field of Classification Search
  USPC .......................................... 370/329
  See application file for complete search history.

(56) References Cited

U.S. PATENT DOCUMENTS

| | | | |
|---|---|---|---|
| 2010/0228854 A1 | 9/2010 | Morrison et al. | |
| 2015/0163735 A1 | 6/2015 | Fischer | |
| 2016/0103164 A1 | 4/2016 | Karandikar et al. | |
| 2021/0377116 A1 | 12/2021 | Yeh et al. | |
| 2023/0199539 A1* | 6/2023 | Lee | H04W 24/08 455/422.1 |
| 2023/0300579 A1* | 9/2023 | Merwaday | B60L 53/67 701/423 |
| 2024/0259879 A1* | 8/2024 | Ranganath | H04L 41/5054 |
| 2024/0305533 A1* | 9/2024 | Bai | H04W 24/02 |

FOREIGN PATENT DOCUMENTS

| | | |
|---|---|---|
| CN | 114080016 A | 2/2022 |
| WO | 2015/138859 A1 | 9/2015 |
| WO | 2020/033856 A1 | 2/2020 |
| WO | 2021/101355 A1 | 5/2021 |
| WO | 2021101335 A1 | 5/2021 |
| WO | 2022/039582 A1 | 2/2022 |

OTHER PUBLICATIONS

Finnish Office Action corresponding to FI Appln. No. 20225184, dated Sep. 15, 2022.
Finnish Office Action corresponding to FI Appln. No. 20225184, dated Jun. 17, 2022.
Extended European Search Report dated Jun. 28, 2023, corresponding to European Patent Application No. 23158935.9.
Anonymous: "ORAN WG2 AI-MLUse case CR traffic steering", ORAN Alliances, Oct. 7, 2019 (Oct. 7, 2019), pp. 1-8, XP055905638, Retrieved from the Internet: URL:https://wiki.o-ran-sc.org/download/att achments/3604609/ATT-2019.10.07-ORAN-WG2 A IML_UseCase_CR traffic_steering.docx?api=v 2>.
Office Action dated Apr. 26, 2023, corresponding to Finnish Patent Application No. 20225880.
Chinese Office Action, with English language translation, corresponding to CN Application No. 202310178442.4, dated Jul. 28, 2025.

* cited by examiner

CELL SITE AUXILIARY EQUIPMENT CONTROL

CROSS REFERENCE TO RELATED APPLICATION

This application claims priority to Finnish Application No. 20225184, filed on Feb. 28, 2022 and Finnish Application No. 20225880, filed on Sep. 30, 2022. The entire content of the above-referenced applications is hereby incorporated by reference.

FIELD

The following example embodiments relate to wireless communication.

BACKGROUND

At a cell site, there may be one or more auxiliary functions, such as a power supply system, temperature control system, etc. It is desirable to optimize the power consumption of such auxiliary functions.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions which, when executed by the at least one processor, cause the apparatus at least to: receive measurement information associated with cell site auxiliary equipment, wherein the measurement information comprises at least one of the following: status metrics or performance metrics associated with the cell site auxiliary equipment; determine, based at least partly on the measurement information, one or more commands for controlling one or more functions of the cell site auxiliary equipment; and transmit the one or more commands to the cell site auxiliary equipment, wherein an E2 interface is used for at least one of the following: receiving at least a part of the measurement information, or transmitting the one or more commands.

According to another aspect, there is provided an apparatus comprising: means for receiving measurement information associated with cell site auxiliary equipment, wherein the measurement information comprises at least one of the following: status metrics or performance metrics associated with the cell site auxiliary equipment; means for determining, based at least partly on the measurement information, one or more commands for controlling one or more functions of the cell site auxiliary equipment; and means for transmitting the one or more commands to the cell site auxiliary equipment, wherein an E2 interface is used for at least one of the following: receiving at least a part of the measurement information, or transmitting the one or more commands.

According to another aspect, there is provided a method comprising: receiving measurement information associated with cell site auxiliary equipment, wherein the measurement information comprises at least one of the following: status metrics or performance metrics associated with the cell site auxiliary equipment; determining, based at least partly on the measurement information, one or more commands for controlling one or more functions of the cell site auxiliary equipment; and transmitting the one or more commands to the cell site auxiliary equipment, wherein an E2 interface is used for at least one of the following: receiving at least a part of the measurement information, or transmitting the one or more commands.

According to another aspect, there is provided a computer program comprising instructions which, when executed by an apparatus, cause the apparatus to perform at least the following: receiving measurement information associated with cell site auxiliary equipment, wherein the measurement information comprises at least one of the following: status metrics or performance metrics associated with the cell site auxiliary equipment; determining, based at least partly on the measurement information, one or more commands for controlling one or more functions of the cell site auxiliary equipment; and transmitting the one or more commands to the cell site auxiliary equipment, wherein an E2 interface is used for at least one of the following: receiving at least a part of the measurement information, or transmitting the one or more commands.

According to another aspect, there is provided a computer readable medium comprising program instructions which, when executed by an apparatus, cause the apparatus to perform at least the following: receiving measurement information associated with cell site auxiliary equipment, wherein the measurement information comprises at least one of the following: status metrics or performance metrics associated with the cell site auxiliary equipment; determining, based at least partly on the measurement information, one or more commands for controlling one or more functions of the cell site auxiliary equipment; and transmitting the one or more commands to the cell site auxiliary equipment, wherein an E2 interface is used for at least one of the following: receiving at least a part of the measurement information, or transmitting the one or more commands.

According to another aspect, there is provided a non-transitory computer readable medium comprising program instructions which, when executed by an apparatus, cause the apparatus to perform at least the following: receiving measurement information associated with cell site auxiliary equipment, wherein the measurement information comprises at least one of the following: status metrics or performance metrics associated with the cell site auxiliary equipment; determining, based at least partly on the measurement information, one or more commands for controlling one or more functions of the cell site auxiliary equipment; and transmitting the one or more commands to the cell site auxiliary equipment, wherein an E2 interface is used for at least one of the following: receiving at least a part of the measurement information, or transmitting the one or more commands.

According to another aspect, there is provided an apparatus comprising at least one processor, and at least one memory storing instructions which, when executed by the at least one processor, cause the apparatus at least to: transmit measurement information to a near-real-time radio intelligent controller, wherein the measurement information comprises at least one of the following: status metrics or performance metrics associated with cell site auxiliary equipment; receive, from the near-real-time radio intelligent controller, one or more commands for controlling one or more functions of the cell site auxiliary equipment, wherein an E2 interface is used for at least one of the following: transmitting at least a part of the measurement information, or receiving the one or more commands; and apply the one or more commands for controlling the one or more functions of the cell site auxiliary equipment.

According to another aspect, there is provided an apparatus comprising: means for transmitting measurement information to a near-real-time radio intelligent controller, wherein the measurement information comprises at least one of the following: status metrics or performance metrics associated with cell site auxiliary equipment; means for receiving, from the near-real-time radio intelligent controller, one or more commands for controlling one or more functions of the cell site auxiliary equipment, wherein an E2 interface is used for at least one of the following: transmitting at least a part of the measurement information, or receiving the one or more commands; and means for applying the one or more commands for controlling the one or more functions of the cell site auxiliary equipment.

According to another aspect, there is provided a method comprising: transmitting measurement information to a near-real-time radio intelligent controller, wherein the measurement information comprises at least one of the following: status metrics or performance metrics associated with cell site auxiliary equipment; receiving, from the near-real-time radio intelligent controller, one or more commands for controlling one or more functions of the cell site auxiliary equipment, wherein an E2 interface is used for at least one of the following: transmitting at least a part of the measurement information, or receiving the one or more commands; and applying the one or more commands for controlling the one or more functions of the cell site auxiliary equipment.

According to another aspect, there is provided a computer program comprising instructions which, when executed by an apparatus, cause the apparatus to perform at least the following: transmitting measurement information to a near-real-time radio intelligent controller, wherein the measurement information comprises at least one of the following: status metrics or performance metrics associated with cell site auxiliary equipment; receiving, from the near-real-time radio intelligent controller, one or more commands for controlling one or more functions of the cell site auxiliary equipment, wherein an E2 interface is used for at least one of the following: transmitting at least a part of the measurement information, or receiving the one or more commands; and applying the one or more commands for controlling the one or more functions of the cell site auxiliary equipment.

According to another aspect, there is provided a computer readable medium comprising program instructions which, when executed by an apparatus, cause the apparatus to perform at least the following: transmitting measurement information to a near-real-time radio intelligent controller, wherein the measurement information comprises at least one of the following: status metrics or performance metrics associated with cell site auxiliary equipment; receiving, from the near-real-time radio intelligent controller, one or more commands for controlling one or more functions of the cell site auxiliary equipment, wherein an E2 interface is used for at least one of the following: transmitting at least a part of the measurement information, or receiving the one or more commands; and applying the one or more commands for controlling the one or more functions of the cell site auxiliary equipment.

According to another aspect, there is provided a non-transitory computer readable medium comprising program instructions which, when executed by an apparatus, cause the apparatus to perform at least the following: transmitting measurement information to a near-real-time radio intelligent controller, wherein the measurement information comprises at least one of the following: status metrics or performance metrics associated with cell site auxiliary equipment; receiving, from the near-real-time radio intelligent controller, one or more commands for controlling one or more functions of the cell site auxiliary equipment, wherein an E2 interface is used for at least one of the following: transmitting at least a part of the measurement information, or receiving the one or more commands; and applying the one or more commands for controlling the one or more functions of the cell site auxiliary equipment.

LIST OF DRAWINGS

In the following, various example embodiments will be described in greater detail with reference to the accompanying drawings, in which FIG. 1 illustrates an example of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
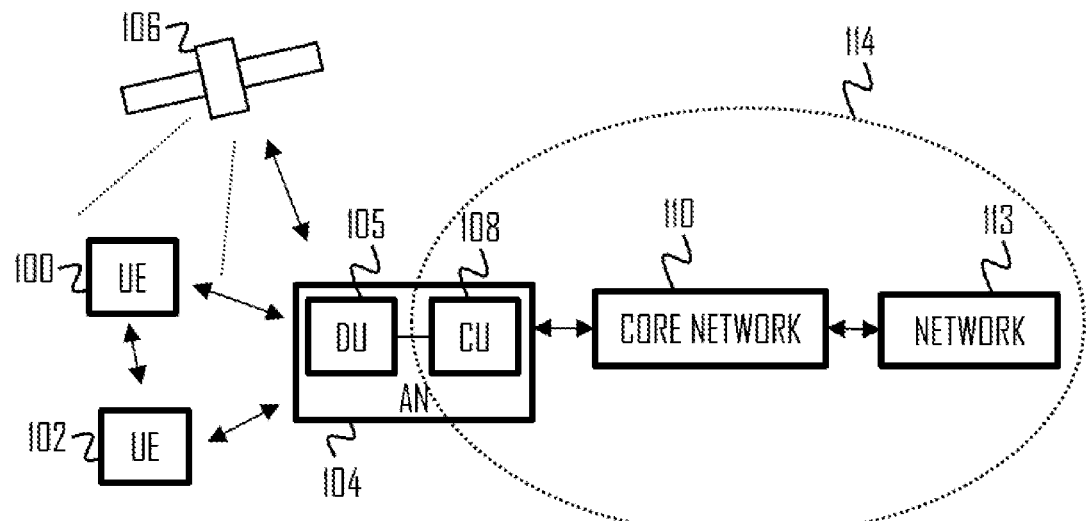

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node (AN) 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes and also for routing data from one access node to another. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the deployed technology, the counterpart that the access node may be connected to on the CN side may be a serving gateway (S-GW, routing and forwarding user data packets), packet data network gateway (P-GW) for providing connectivity of user devices to external packet data networks, user plane function (UPF), mobility management entity (MME), or an access and mobility management function (AMF), etc.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz—cmWave—mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with one or more other networks 113, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or the like, providing facilities for networks of different operators to cooperate for example in spectrum sharing.

An access node may also be split into: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be defined as a logical node hosting higher layer protocols, such as radio resource control (RRC), service data adaptation protocol (SDAP) and/or packet data convergence protocol (PDCP), of the access node. The DU 105 may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU 108 and/or DU 105. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of functions between the above-mentioned access node units, or different core network operations and access node operations, may differ.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It is also possible that node operations may be distributed among a plurality of servers, nodes or hosts. Application of cloudRAN architecture enables RAN real-time functions being carried out at the RAN side (e.g., in a DU 105) and non-real-time functions being carried out in a centralized manner (e.g., in a CU 108).

It should also be understood that the distribution of functions between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay node or by an access node 104 located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may comprise a plurality of access nodes, the user device may have access to a plurality of radio cells and the system may also comprise other apparatuses, such as physical layer relay nodes or other network elements, etc. At least one of the access nodes may be a Home eNodeB or a Home gNodeB.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node (s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

At a cell site, there may also be supporting auxiliary (AUX) equipment in addition to the actual base station equipment. The auxiliary equipment may comprise, for example, at least one of the following: a back-up power supply system, a temperature control system, an air conditioning system, an air conditioning system, a liquid cooling system, transport network equipment (e.g., (switches, routers, optical devices, microwave link equipment), a motion detector, a camera, a drone charging station, a radar, a lidar, a positioning device (e.g., GPS), a diesel power generator, a solar panel, jamming or anti-jamming equipment, a door sensor (i.e., a sensor indicating whether the door is open or closed), an earthquake sensor, an air pollution sensor, a wind meter/gauge (anemometer), a temperature sensor, a humidity sensor, a leakage indicator, a corrosion sensor, an actuator, an intrusion alarm system, or a fire alarm system.

The actual base station equipment may be controlled and managed by a network management system (NMS). However, for the auxiliary equipment, a holistic control and management system may currently be missing. Such a management system for the auxiliary equipment may be useful for example when optimizing the end-to-end (E2E) energy consumption of the whole cell site. Furthermore, the AUX functions may have a significant direct and/or indirect impact on the BTS equipment reliability, availability and overall performance.

While a base station may use a power grid (electrical grid) as its main power source, the base station may comprise one or more batteries as a back-up power source that may be used during power outages, for example. The back-up batteries of one or more base stations may be organized as a virtual power plant (VPP) that can be operated as a separate entity or integrated to a VPP of an electricity operator. Such a scheme may also be referred to as a radio network virtual power plant herein.

As a non-limiting example, the back-up battery capacity of a single base station may be approximately 400 Ah (at 48 V). Thus, assuming for example 10 million base stations globally, the back-up battery capacity of these base stations would be approximately 100 GWh in total.

A virtual power plant may be defined as a collection of energy storages possibly owned by one or more parties, but controlled together as one collection of energy sources that can provide electrical energy to a power grid (e.g., when energy demand is high compared to supply), and store electrical energy from the power grid (e.g., when energy demand is low compared to supply). For example, at night, energy demand may generally be lower than during daytime.

VPP means active participation into the energy balancing markets set by a transmission system operator (TSO), for example. Whereas peak shaving aims to optimize the cost of electricity, VPP aims to provide the TSO an additional power capacity option that can be used, if the grid balance (i.e., available power vs. the power usage) is threatened and the grid frequency starts to deviate from the nominal frequency (e.g., 50 Hz). In most cases, it may be sufficient to offload the power capacity (e.g., base stations) from the power grid for a short duration in order to be eligible to participate into the VPP market. During the offloading, the base stations may be run by the battery back-up system.

When discharging a battery of a base station, the discharged energy can be used to operate the base station (i.e., using the battery as a power source instead of the power grid), or the discharged energy can be provided back to the power grid. For example, the batteries of the base station may be charged from the power grid at night (during low energy demand), and then discharged back to the power grid during daytime (when energy demand is higher).

Alternatively, the battery of one base station may be discharged to a battery of another base station. For example, during the day (during high energy demand) energy may be transferred from a "residential" base station to a "business center" base station. On the other hand, during the night (during low energy demand), energy may be transferred from the "business center" base station to the "residential" base station. In this case, the transfer is a battery-to-battery transfer in direct current (DC). The discharging can be done when the base station is operating in a normal state, i.e., when no alarms are triggered that would prevent discharge.

However, the amount of discharged energy may need to be limited, so that the remaining battery level meets regulatory requirements. For example, regulatory requirements may require that the base station is able to operate for at least two to four hours on battery power (e.g., in case of a power outage). It should be noted that the specific amount of time in the regulatory requirements may vary in different geographical areas or countries. As the regulatory requirements for the minimum time for battery operation may vary based on geographical area, a location-based service may be used to determine the needed action.

The sufficient battery level to meet these regulatory requirements may be determined based on the historical information of the base station, for example regarding its data traffic (e.g., at different times of the day, days of the week, holidays, events, etc.). The data traffic history of the base station may be collected by the NMS. The NMS is a server that uses FCAPS (fault, configuration, accounting, performance and security) information to manage a data network. The network management system may also be referred to as a network management station or network management tools. In addition to network key performance indicators (KPIs), the decision may involve other KPIs, such as measurements for the power consumption of the base station. When discharging energy from the batteries to the power grid, the time to recharge the batteries may also be taken into account.

Furthermore, it is possible for base station batteries to be over-dimensioned for VPP purposes. The over-dimensioning means that the battery capacity may be larger than normally used for base stations (without VPP). This gives more flexibility to use batteries for VPP purposes as described herein.

The decision-making architecture for VPP use may be centralized, for example a near real-time (RT) radio intelligent controller (RIC) may provide charging/discharging instructions to the base station. Alternatively, the decision-making may be distributed (e.g., the base station itself makes decisions independently) or based on a hybrid model (e.g., the near-RT RIC and the base station may both be involved in the decision-making).

The decision-making entity (e.g., near-RT RIC) may collect information on, for example, electricity price, battery levels, data traffic estimates, alarms, configurations, etc. Based on the collected information, the decision-making entity may determine the optimal time when to use the batteries to operate the base station (or another base station), when to discharge the batteries to the power grid, or when to charge the batteries. When determining, or forecasting, the best time and duration for these actions, other sources of information, such as event calendars, weather forecast information, etc., may also be used. This information may be available from the internet, for example.

The decision-making entity may also take the power grid status into account. The power grid status may be received from the power grid control system, or the decision-making entity may determine the power grid status from frequency measurements of the power grid.

The decision-making entity may also be used to control generators. For example, in developing countries, internal combustion engine generators (e.g., diesel generators) may be used to operate base stations and to provide electricity to a village or settlement. The use of generators for base station operation and for villages can be optimized similarly as described above.

In addition to the power systems that reside at a cell site, also a cooling and warming system may be co-located. This is due to the fact that overheating of the telecommunication equipment may need to be avoided. For example, in some countries, ice and snow on rooftops (cell sites are often located in attic areas) demand the need to keep the cell site temperatures under a certain limit, so that the snow on the rooftop does not fall down uncontrollably and cause damage at the street level. The BTS back-up systems, such as batteries, may also require a temperature control system with warming, so that the batteries are not damaged during cold periods. All these reasons may result in the use of a warming system (e.g., electrically powered) and/or cooling systems, such as air ventilation or air-conditioning. It may be beneficial to have a centralized control system for such auxiliary equipment. A cell site may also be referred to as a RAN site herein.

When it comes to liquid cooling of cell sites, some further needs emerge. The flow rate of the liquid pumps, the health check of the pumps, the efficiency of the heat exchanger system, and liquid level are some KPIs that may be beneficial to be controlled. Furthermore, if the waste heat originating from liquid cooling is repurposed, then it would be useful if the energy amount can be quantified.

Some further examples of AUX equipment at a cell site may include sensors, such as leakage indicators, temperature and humidity sensors, corrosion sensors, intrusion alarm, and fire alarm.

The auxiliary equipment may consume a significant amount of electrical power. However, communications service providers (CSPs) may not have information on their total energy consumption. Thus, the energy use may not be optimal. By knowing how much the consumed power for a given element at a cell site is, this allows the CSP to run cell sites with improved power efficiency. For example, the transferred bit per used power (including both the telecommunication equipment and AUX equipment) can be optimized.

Some example embodiments provide a method for using a radio intelligent controller (RIC) and the E2 interface to create such a control and management mechanism for the auxiliary equipment at a cell site. Some example embodiments provide a RIC application for example for the BTS back-up battery use case. However, control and management through RIC may be applied similarly to any other AUX equipment use cases as well.

Some example embodiments may be based on the near-RT RIC defined by O-RAN (open radio access network), by extending the functionality of the near-RT RIC from RAN function control to RAN site function control, covering any equipment (including AUX equipment) on the site, and enabling to achieve a single platform controlling any aspects relevant to the RAN and RAN site operation.

O-RAN refers to a concept based on interoperability of RAN elements between different vendors over a set of defined interfaces. Thus, O-RAN enables baseband unit and radio unit components from different vendors to operate together. O-RAN provides comprehensive capabilities to monitor and manage RAN features. O-RAN can be extended to cover all cell site level functions described above, so that the cell site can be holistically managed, and the energy consumption can be evaluated.

However, it should be noted that some example embodiments are not limited to O-RAN, and they may be applied to any other RAN architecture as well.

Some example embodiments provide a unified platform solution for controlling all RAN site functions (in addition to RAN functions like vCU, vDU, etc.) including for example mechanisms that implement BTS as a virtual power plant (VPP), battery use for peak shaving, temperature control system, end-to-end energy consumption control, and joint RAN functions and AUX functions optimization.

As an example of the above, power consumption optimization of radio units can be done together with the optimization of overall power consumption of the site. In this case, the optimization may be up or down regulation in the energy balancing market. However, currently there may be no such platform available. The AUX functions may currently be using proprietary solutions that do not allow holistic measurement, control, and management of cell sites. Some of the control mechanisms do not support full telecommunication grade security features, thus making the proprietary solutions vulnerable to unintentional and intentional fault situations, including hybrid attacks.

Some example embodiments may be used to monitor, control and manage all resources, such as energy and temperature, at a cell site level. This in turn enables secure and smart operation of the BTS with end-to-end visibility. Some example embodiments may enable to optimize electrical energy use and provide KPIs at a given cell site, but not only for telecommunication equipment. This in turn provides an opportunity to use extensively those cell sites, where the energy efficiency or transferred bit rate per used energy KPI is high. The end-to-end visibility of the energy use also suggests on how to run a cell site at high efficiency.

Thus, some example embodiments may enable the optimization of telecommunication power saving features at cell site level, as the end-to-end energy consumption profile is made visible. Some example embodiments may support all configurations: both those that are directly end-to-end compatible and those that require some sort of an adapter in order to be compatible. For example, multivendor support for all power system manufacturers may be enabled.

Furthermore, some example embodiments may enable the use of wide scope of preventive maintenance measures. For example, battery health check, fan speeds (both product internal and cell site level), and liquid pumps, and even heat exchanger condition can be either directly or indirectly estimated. Thus, maintenance may be called only when the real need is there.

Some example embodiments are described below using principles and terminology of 5G technology without limiting the example embodiments to 5G communication systems, however.

Figure 2:
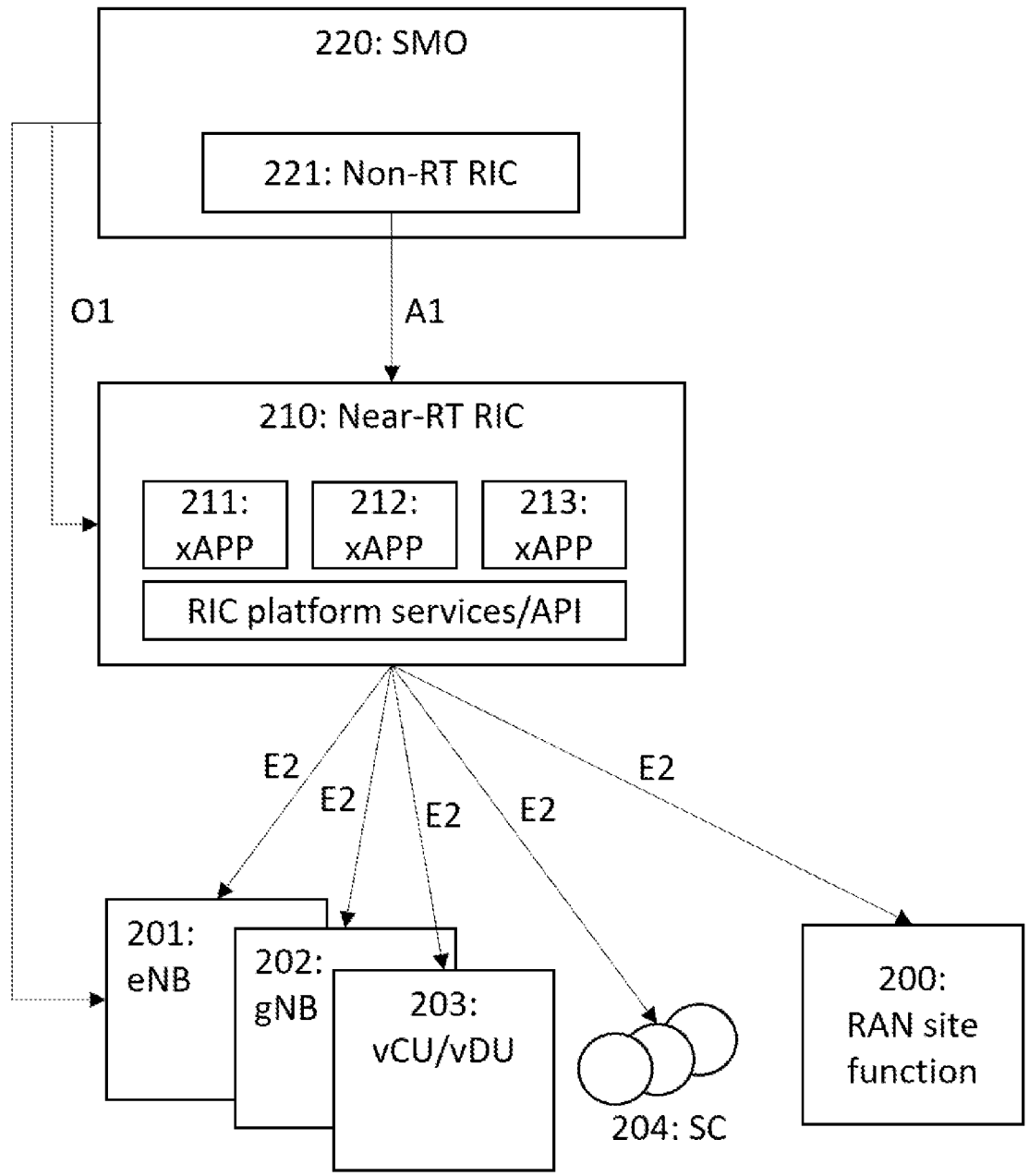
FIG. 2 illustrates an example of a system.

FIG. 2 illustrates an example of a system, to which some example embodiments may be applied. FIG. 2 illustrates an O-RAN architecture extended to support RAN site function control. Herein the term "RAN site function" may refer to cell site auxiliary equipment. There may be an N:M mapping between RAN site functions and cell site auxiliary equipment, such that one cell site auxiliary equipment may comprise one or more RAN site functions, or vice versa.

The near-RT RIC platform 210 defined by O-RAN offers a range of services to applications, called xApps 211, 212, 213, wherein a given xAPP may control some RAN function (s) or RAN site function(s) or a part of it. xApps can also exchange information between them, enabling to build sophisticated use cases leveraging the capabilities of the multiple xApps.

Additionally, O-RAN has defined a network management entity called service management and orchestration (SMO) 220, within which another control function called a non-real-time RIC 221 resides. The SMO 220 may be connected to the RAN network functions, including the near-RT RIC 210, via an O1 interface which is an FCAPS interface. The non-real-time RIC 221 may be used to control the near-RT RIC 210. The non-RT RIC 221 may be connected to the near-RT RIC 210 via an A1 interface, which is a declarative policy interface, for conveying service level policies guiding the near-RT RIC 210.

The near real-time RIC 210 may be used for controlling RAN functions (e.g., radio admission control, UE inactivity handling, handover control, beam management, etc.) and RAN site functions (e.g., cell site auxiliary equipment). This control utilizes the E2 interface between the near-RT RIC 210 and the entities 200, 201, 202, 203, 204 executing the RAN functions or RAN site functions. The entities 201, 202, 203, 204 executing the RAN functions may include, for example, DU, CU-CP, CU-UP, gNB, eNB, and/or small cells (SC).

One or more RAN site functions 200 (e.g., AUX functions) may be included in the O-RAN architecture by extending the E2 interface to also support RAN site functions, thereby enabling to build one or more xApps 211, 212, 213 that control those RAN site functions and further enabling the non-RT RIC 221 to define A1 policies for guiding these xApps. These xApps may also be subject to integration to the SMO 220 via the O1 interface, like any other xApps used for controlling RAN functions.

The one or more RAN site functions 200 and the entities 201, 202, 203, 204 may be called E2 nodes. There may be a single generic E2 node type covering all the various RAN site functions (e.g., E2 node type: RAN site function), or there may be separate E2 node types for each specific RAN site function (e.g., E2 node type: power supply system, E2 node type: temperature control system, etc.).

An E2 node 200, 201, 202, 203, 204 may be defined as a logical node terminating the E2 interface interfacing with the near-RT RIC 210. A RAN function or a RAN site function may be defined as a specific function in an E2 node.

The E2 application protocol (E2AP) connecting the near-RT RIC 210 and a given E2 node 200, 201, 202, 203, 204 has a flexible structure that allows extension of its control capabilities by means of separating common procedures and services from specific RAN function related definitions by capsulating the latter in E2 service models (E2SM). RAN functions themselves may not be standardized but can be defined by the vendors.

More precisely, a RAN function or RAN site function offers a set of services to be exposed over the E2 interface using E2AP-defined procedures. Using these procedures, E2AP supports four basic RIC services: REPORT, INSERT, CONTROL and POLICY.

With the REPORT service, the RAN function or RAN site function may be configured to report, to the near-RT RIC, information obtained during a specified trigger event. For example, the REPORT service may be used for handover announcement or for reporting measurement information.

With the INSERT service, the RAN function or RAN site function may be configured to suspend the normally autonomous process during a specified trigger event and forward the state to the near-RT RIC for subsequent processing. For example, the INSERT service may be used for exception handling.

With the CONTROL service, the near-RT RIC may send a CONTROL message to initiate a process in the RAN function or RAN site function from a specified state (e.g., for a specified UE within a particular group of UEs). The CONTROL service may be used as a response to INSERT, or it may be used autonomously. For example, the CONTROL service may be used for automatic neighbor relation (ANR) neighbor update.

With the POLICY service, the near-RT RIC may configure the RAN function or RAN site function to modify a response to a specified trigger event within a specified procedure according to a specific POLICY. For example, the POLICY service may be used for RAN optimization.

A specific E2SM defines how these RIC services may be realized for a given RAN function or RAN site function via definition of a set of E2AP containers. For example, an E2SM-KPM container may define how 3GPP SAS measurements are transported as REPORTs. As another example, an E2SM-NI container may define how 3GPP RAN3 network interface messages may be carried for trace (as REPORT) and how call flows may be guided (using POLICY) or altered (using INSERT and CONTROL).

There are three main reasons why using the near-RT RIC 210 may be beneficial. The first reason is that it eliminates the need for installing and managing extra edge computing hardware, allowing a common platform to execute a variety of use cases for controlling both the RAN as well as the cell site auxiliary equipment. The second reason is the capability to cross-connect information between the various use cases, enabling to build more sophisticated use cases. The third reason is that it allows lower and more predictable latency in between cell site hardware and control software, when compared to utilizing network management systems for the control purposes. Lower latency allows, for example, controlling energy resources based on alternating current (AC) frequency monitored in real time. In some cases, AC frequency may be measured at one base station and that metric may be used when the near-RT RIC controls other base stations with low latency. This option allows to use simpler hardware without AC measurement features.

In the following, it is described how the E2 interface can be extended to support RAN site functions 200 (auxiliary equipment), describing the modifications/additions needed on the E2 interface.

Figure 3A:
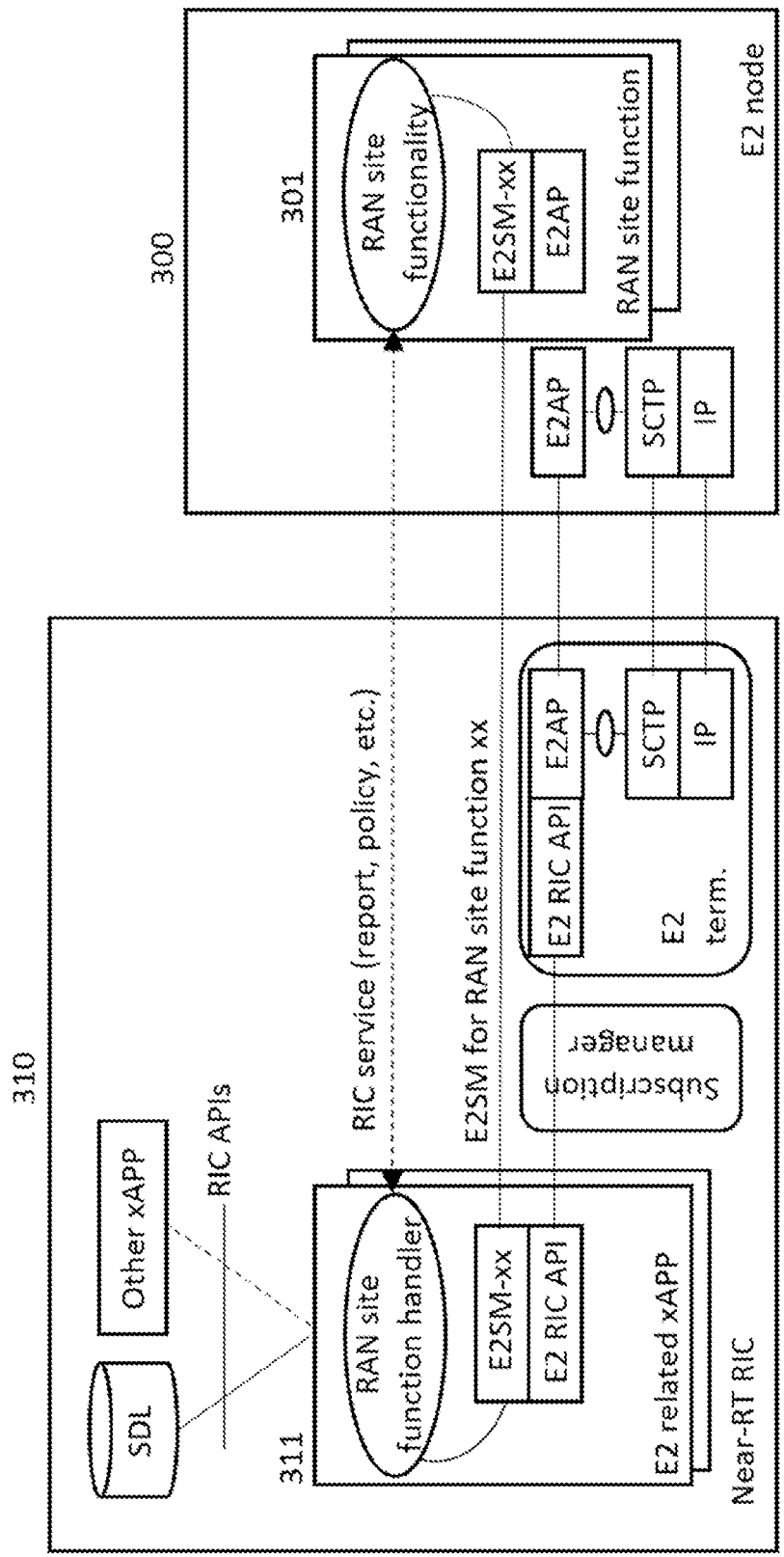
FIG. 3A illustrates an example of E2-based control of cell site functions.
Figure 3B:
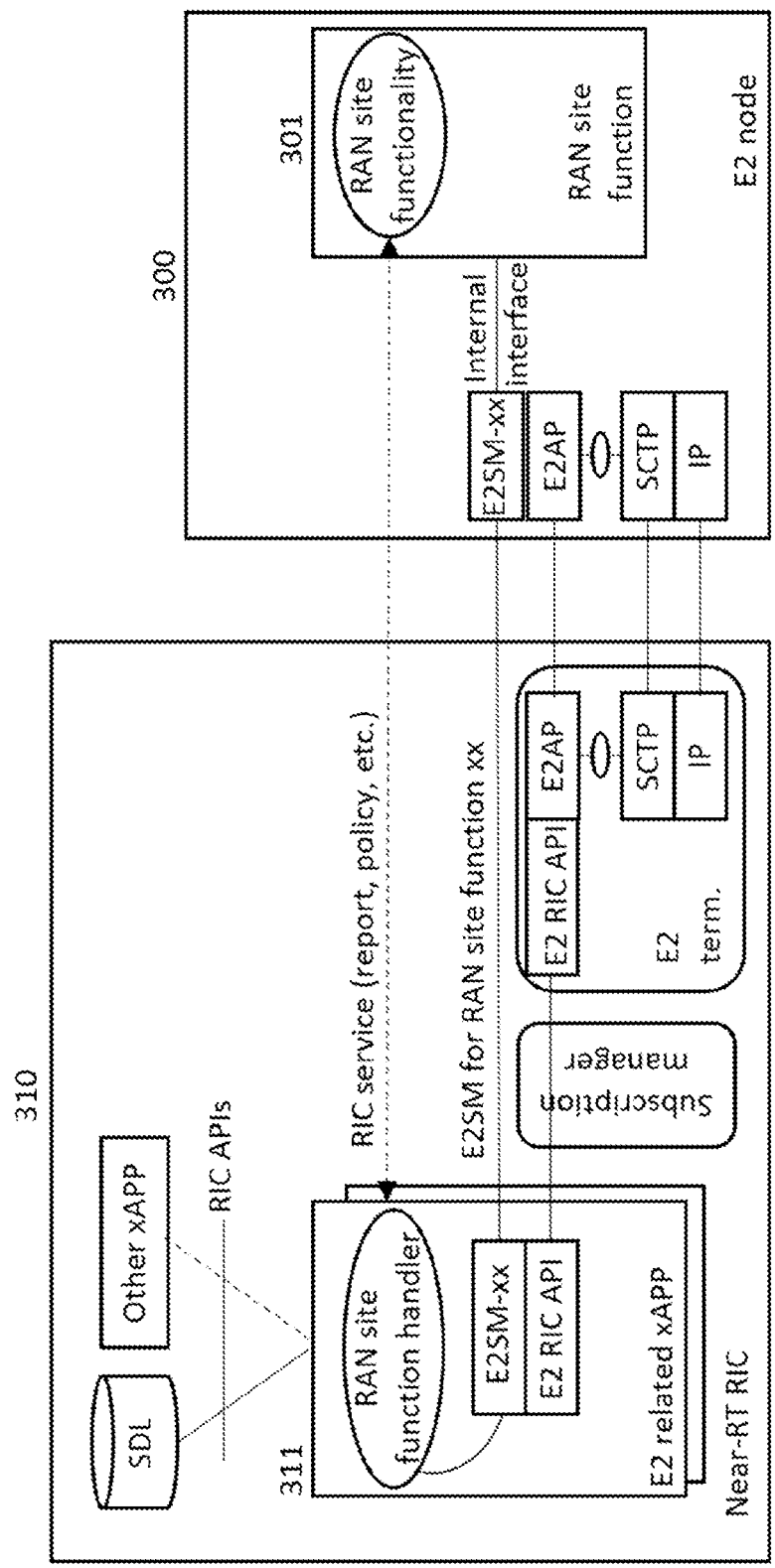
FIG. 3B illustrates an example of E2-based control of cell site functions.

FIGS. 3A and 3B illustrate examples of E2-based control of RAN site function(s). FIG. 3A illustrates an alternative, wherein an E2 node 300 comprises one or more RAN site functions 301, and a given RAN site function 301 is aware of E2 and implements an E2SM. FIG. 3B illustrates an alternative, wherein only the E2 node 300 is aware of E2, and the E2 node 300 has an internal interface that is used to communicate with a given RAN site function 301 (i.e., the RAN site function is unaware of E2 in this case). In other words, the alternative of FIG. 3B enables to use the internal interface without requiring every RAN site function to be modified to support E2, since the adaptation to E2 is done at the E2 node level.

Referring to FIGS. 3A and 3B, there may be a stream control transmission protocol (SCTP) or internet protocol (IP) based connection between the E2 node 300 and the near-RT RIC 310. Furthermore, there may be an E2AP layer, on top which an E2SM may be built. In FIGS. 3A and 3B, the xx in E2SM-xx means that the E2SM is built to support a specific RAN site function 301 denoted as xx. An E2-related xAPP 311 in the near-RT RIC 310 may communicate with the RAN site function 301 by using one or more RIC services (report, policy, etc.). The E2-related xAPP 311 may also be referred to as a RAN site function handler application herein. The E2 interface within the near-RT RIC 310 may provide an E2 RIC application programming interface (API) that may enable the E2-related xAPP 311 to use services provided by the E2 interface. In FIGS. 3A and 3B, SDL is an abbreviation for simple DirectMedia layer.

As shown in FIGS. 3A and 3B, the E2 interface may be extended to support RAN site function control by defining a given RAN site function 301 as an E2 node 300 and defining the associated E2 SM to describe the services exposed by that RAN site function 301.

As another example, a hybrid interfacing model may also be possible. For example, in the hybrid interfacing model the RAN site function or E2 node may transmit some or all of its measurement information to the near-RT RIC via another interface (e.g., a proprietary interface) instead of the E2 interface, and the near-RT RIC may transmit commands to the RAN site function or E2 node via the E2 interface. Alternatively, the RAN site function or E2 node may transmit some or all of its measurement information to the near-RT RIC via the E2 interface, and the near-RT RIC may transmit commands to the RAN site function or E2 node via another interface (e.g., a proprietary interface).

In another example, the interfaces towards the cell site auxiliary equipment may all be proprietary interfaces, but the near-RT RIC may adapt them and offer internally E2-compliant APIs and/or other related near-RT RIC APIs. In other words, the near-RT RIC may do an adaptation from the proprietary external interface to E2-compliant APIs and/or other related near-RT RIC APIs.

The E2 interface has a modular architecture, allowing addition of new E2 node types as well as new functions to be controlled via xApps 311. E2 procedures are divided into global procedures (e.g., related to connection setup between the near-RT RIC 310 and E2 node 300) and functional procedures (e.g., related to how RIC services are implemented on the E2 interface). Global procedures, as the name implies, are generic and apply to all E2 nodes.

The global procedures may include, for example: common signaling between the near-RT RIC and E2 node, E2 SETUP, E2 node configuration update, E2 connection update, E2 RESET, error indication, RIC service query, and RIC service update.

The functional procedures may include, for example: application-specific signaling between the near-RT RIC and E2 node, E2AP SUBSCRIPTION, E2AP SUBSCRIPTION DELETE, E2AP INDICATION, and E2AP CONTROL. These functional procedures may also be used for the RAN site function control purposes.

A mapping of the RIC services to the E2 functional procedures is shown in Table 1 below. The E2AP functional procedures may be used for implementing the RIC services (REPORT, INSERT, CONTROL, POLICY).

TABLE 1

| | E2AP procedure | | |
|---|---|---|---|
| RIC service | E2AP SUBSCRIPTION | E2AP INDICATION | E2AP CONTROL |
| REPORT | Installs RIC service | Carries outcome of RIC service | — |
| INSERT | Installs RIC service | Carries outcome of RIC service | — |
| CONTROL | — | — | Initiates RIC service |
| POLICY | Installs RIC service | — | — |

The E2 information model is based on the available subset of the information elements requested by the xApps and the information elements made available by the cell site. The near-RT RIC may instruct the cell site on how to behave in the case of defined events or alternatively directs the cell site to provide specified "reports" immediately. Each of these instructions may cause the cell site to provide an acknowledgement, which identifies the extent to which it can comply with the request.

Figure 4:
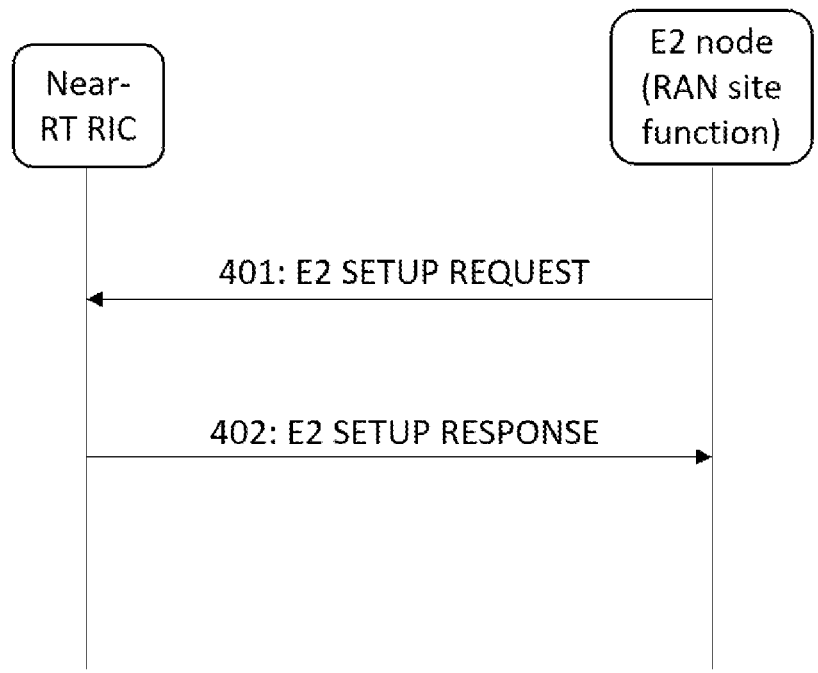
FIG. 4 illustrates a signaling diagram according to an example embodiment.

FIG. 4 illustrates a signaling diagram for the E2 SETUP procedure according to an example embodiment. The purpose of the E2 SETUP procedure is to discover the RIC and IP address for the E2 interface, establish an E2 connection between the E2 node (e.g., RAN site function) and the xApp, learn the global E2 node ID of the E2 node, learn the list of supported RAN site functions (and related identifiers), learn the list of E2 node component configuration information, and enable accepted RAN site functions.

Referring to FIG. 4, in block 401, an E2 node comprising one or more RAN site functions transmits an E2 setup request message to a near-RT RIC. The RAN site function(s) may comprise cell site auxiliary equipment. The E2 setup request message may comprise at least one of the following information elements: a transaction ID, a global E2 node ID of the E2 node, a RAN site function list, and/or E2 node component configuration information. Herein ID is an abbreviation for identifier. The E2 node ID format may depend on the E2 node type in question. The RAN site function list may indicate the functions supported by the E2 node, wherein these functions may be controlled by the near-RT RIC. For example, in case the E2 node is a power supply system, then the functions may comprise one or more batteries, an inverter, etc.

In block 402, the near-RT RIC transmits an E2 setup response message to the E2 node in response to the E2 setup request. The E2 setup response message may comprise at least one of the following information elements: the transaction ID, the global E2 node ID of the E2 node, a global RIC ID of the near-RT RIC, a list of RAN site functions accepted, a list of RAN site functions rejected, and/or a list of E2 node component configuration acknowledgement (e.g., success or failure).

The list of RAN site functions accepted may comprise a list of accepted functions to be enabled by the cell site auxiliary equipment.

No changes may be needed to the transaction ID, when extending E2 to RAN site function(s).

For the global E2 node ID, RAN site function related identifiers may need to be defined, when extending E2 to RAN site function(s).

For the RAN site function list, the supported RAN site function(s) may be listed here, when extending E2 to RAN site function(s).

The E2 node component configuration information may or may not be applicable in the context of RAN site functions.

Figure 5:
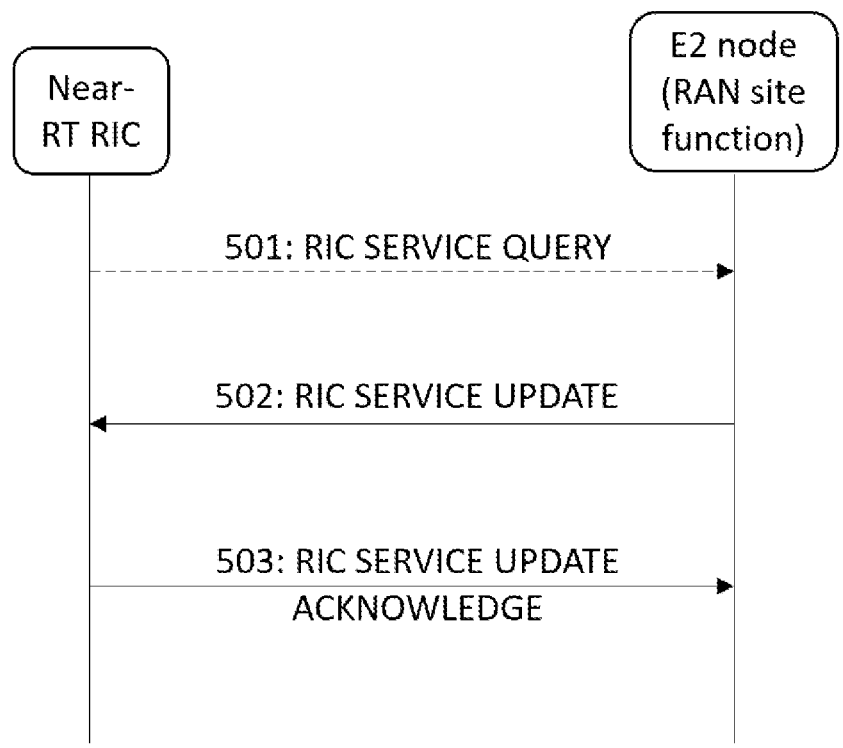
FIG. 5 illustrates a signaling diagram according to an example embodiment.

FIG. 5 illustrates a signaling diagram for the RIC SERVICE UPDATE procedure according to an example embodiment. The purpose of the RIC SERVICE UPDATE procedure is to request the E2 node to refresh the list of supported RAN site functions, to inform the near-RT RIC of changes to the list of supported RAN site functions (e.g., identifier and description), to discover a RAN site specific xAPP for E2SM decode, and to enable accepted RAN site functions.

In block 501, a near-RT RIC may transmit a RIC service query to an E2 node comprising one or more RAN site functions. The RAN site function(s) may comprise cell site auxiliary equipment. The RIC service query may comprise at least one of the following information elements: a transaction ID, and/or a list of RAN site functions accepted.

In block 502, the E2 node transmits a RIC service update message to the near-RT RIC. The RIC service update message may be transmitted in response to the RIC service query that may be received from the near-RT RIC. Alternatively, the RIC service update message may be transmitted autonomously without receiving a separate RIC service query.

With the RIC service update message, the E2 node may provide at least one of the following to the near-RT RIC: updated configuration information of the cell site auxiliary equipment, or updated capability information of the cell site auxiliary equipment. The RIC service update message may comprise at least one of the following information elements: the transaction ID, a RAN site functions added list, a RAN site functions modified list, and/or a RAN site functions deleted list.

In block 503, the near-RT RIC transmits a RIC service update acknowledge message to the E2 node in response to receiving the RIC service update message. The RIC service update acknowledge message may comprise at least one of the following information elements: the transaction ID, a RAN site functions accepted list, and/or a RAN site functions rejected list.

Figure 6:
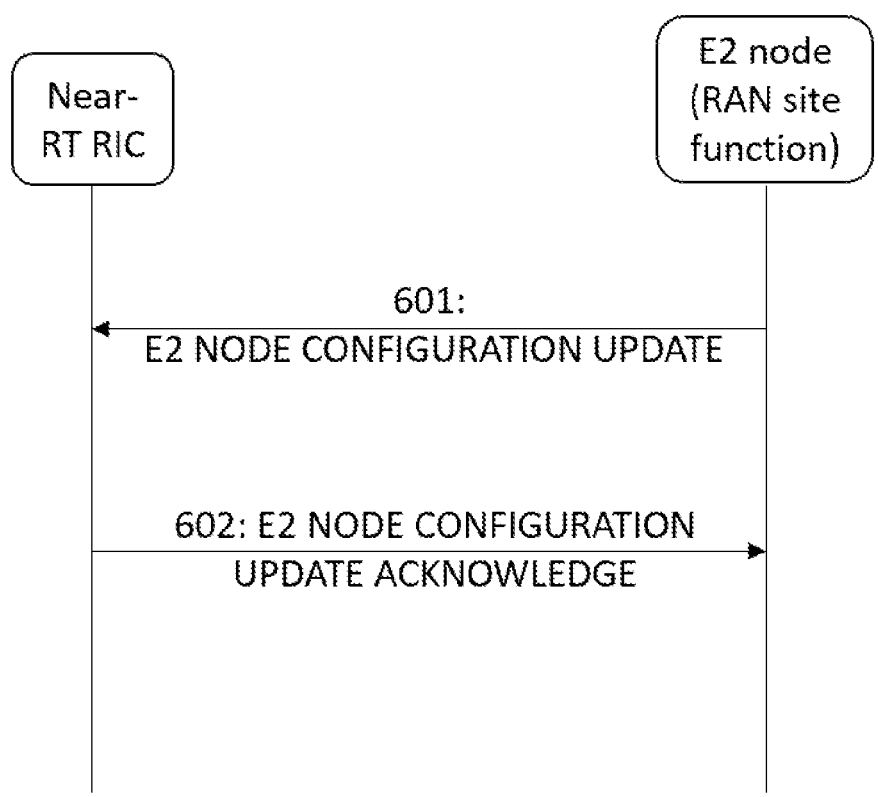
FIG. 6 illustrates a signaling diagram according to an example embodiment.

FIG. 6 illustrates a signaling diagram for an E2 NODE CONFIGURATION UPDATE procedure according to an example embodiment. The purpose of the E2 NODE CONFIGURATION UPDATE procedure is to inform the near-RT RIC of configuration changes for a list of E2 node components. The information may be formatted using 3GPP RAN configuration update messages (e.g., NGAP, E1AP, F1AP, etc.).

Referring to FIG. 6, in block 601, an E2 node comprising one or more RAN site functions transmits an E2 node configuration update message to a near-RT RIC. The RAN site function(s) may comprise cell site auxiliary equipment.

With the E2 node configuration update message, the E2 node may provide at least one of the following to the near-RT RIC: updated configuration information of the cell site auxiliary equipment, or updated capability information of the cell site auxiliary equipment. The E2 node configuration update message may comprise at least one of the following information elements: a transaction ID, a global E2 node ID of the E2 node, and/or an E2 node component configuration update list.

In block 602, the near-RT RIC transmits an E2 node configuration update acknowledge message to the E2 node in response to receiving the E2 node configuration update message. The E2 node configuration update acknowledge message may comprise at least one of the following information elements: the transaction ID, and/or an E2 node component configuration update acknowledgement list (e.g., success or failure).

Figure 7:
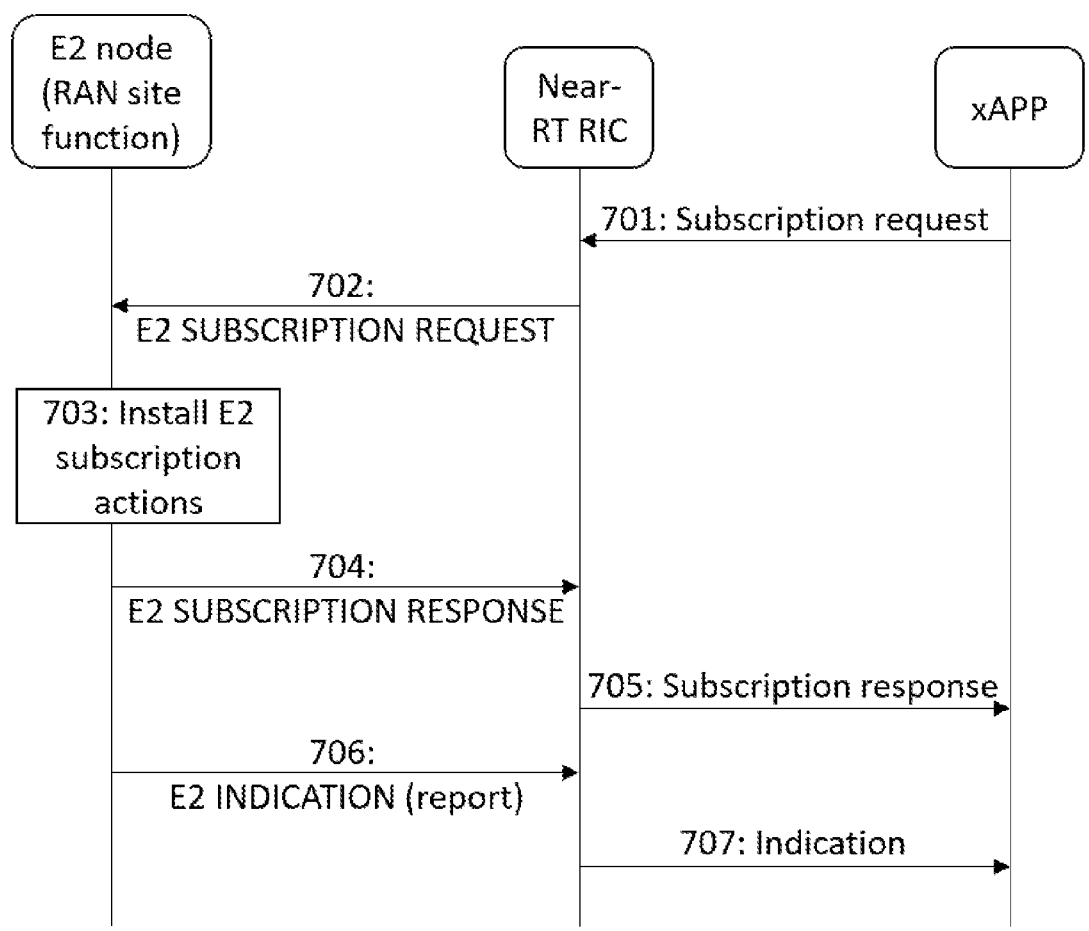
FIG. 7 illustrates a signaling diagram according to an example embodiment.

FIG. 7 illustrates a signaling diagram for E2 SUBSCRIPTION procedure according to an example embodiment. After the E2 setup (illustrated in FIG. 4) is complete, the E2 SUBSCRIPTION can be used to install a POLICY to the E2 node (e.g., to a RAN site function), or to install a REPORT trigger event.

Referring to FIG. 7, in block 701, an xAPP transmits a subscription request message to a near-RT RIC. The subscription request message may comprise, for example, an E2 node ID and a subscription message.

In block 702, based on the subscription request message received from the xAPP, the near-RT RIC transmits an E2 SUBSCRIPTION REQUEST message to a an E2 node comprising one or more RAN site functions. The RAN site function(s) may comprise cell site auxiliary equipment. The E2 SUBSCRIPTION REQUEST message may be used for installing (configuring) a policy or a trigger event at the E2 node for reporting measurement information associated with the cell site auxiliary equipment.

The E2 SUBSCRIPTION REQUEST message may comprise at least one of the following information elements: a RIC request ID, a RAN site function ID associated with the RAN site function or E2 node, and/or RIC subscription details, such as a RIC event trigger definition and/or a sequence of actions (the contents may be defined in a RAN site function specific E2 service model). The sequence of actions may comprise, for example, a RIC action ID, RIC action type, RIC action definition, and RIC subsequent action.

The RIC request (e.g., with format xAPP ID, SN) may be used to uniquely identify configured subscriptions in both RIC and RAN site during creation and to route eventual response.

The RAN site function ID may be used by the xAPP and cell site to identify a function within the target ID. The target ID may be used by the near-RT RIC to identify a target entity for the message, e.g., to send a subscription API call to the correct target (i.e., specific E2 termination instance and hence specific RAN site node).

In block 703, the E2 node accepts and installs the subscription actions in the target RAN site function.

In block 704, the E2 node transmits an E2 SUBSCRIPTION RESPONSE message to the near-RT RIC in response to the E2 SUBSCRIPTION REQUEST message. The E2 SUBSCRIPTION RESPONSE message may comprise at least one of the following information elements: the RIC request ID, the RAN site function ID, a RIC actions admitted list (list of RIC action ID), and/or a RIC actions not admitted list, i.e., the outcome of the subscription.

In block 705, the near-RT RIC transmits a subscription response message to the xAPP in response to the subscription request message received in block 701. The subscription request message may comprise, for example, the E2 node ID and the subscription message.

In block 706, if the subscription was for a REPORT, the E2 node transmits an E2 INDICATION (report) message to the near-RT RIC. For example, the E2 INDICATION message may be transmitted based on detecting a corresponding trigger event set by the subscription. The E2 INDICATION message may comprise at least one of the following information elements: the RIC request ID, the RAN site function ID, the RIC action ID, an indication SN, an indication type, an indication header, and/or an indication message. The contents of the indication header and the indication message may be defined in the RAN site function specific E2 service model.

The indication SN may be used to uniquely identify a specific indication response (e.g., used when trigger may result in multiple responses).

In block 707, the near-RT RIC may transmit an indication to the xAPP based on the received E2 INDICATION message. The indication may comprise, for example, the E2 node ID and the indication message.

Figure 8A:
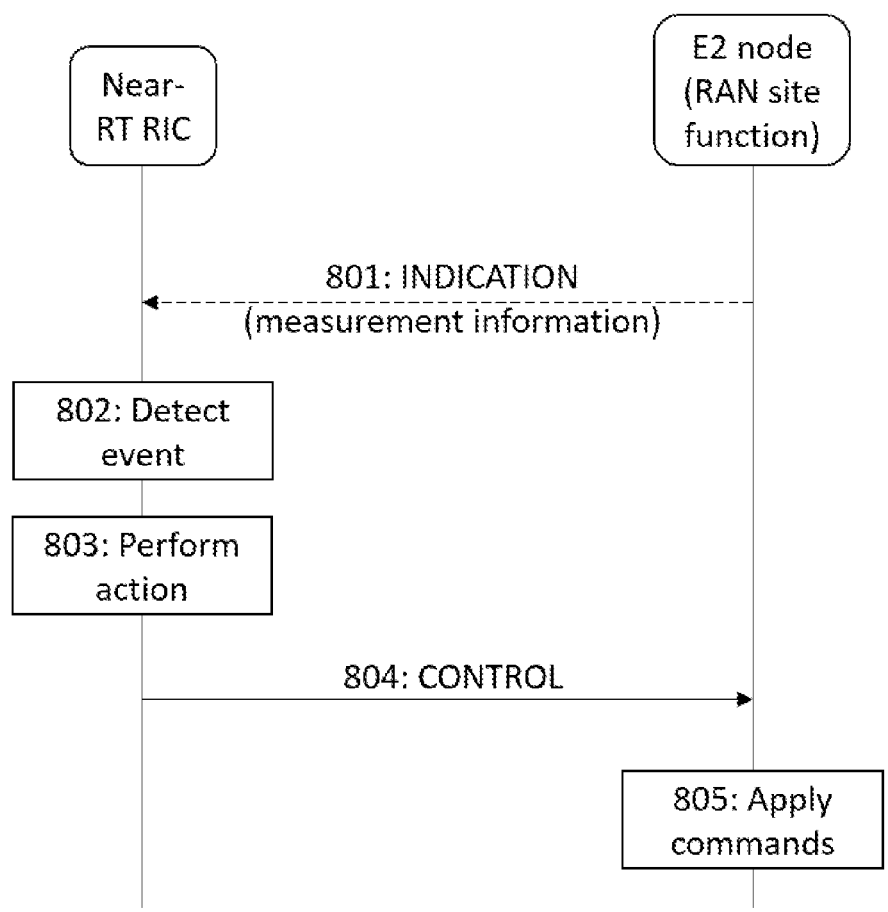
FIG. 8A illustrates a signaling diagram according to an example embodiment.

FIG. 8A illustrates a signaling diagram for an E2 CONTROL procedure according to an example embodiment.

Referring to FIG. 8A, in block 801, an E2 node comprising one or more RAN site functions may transmit an indication to a near-RT RIC. The RAN site function(s) may comprise cell site auxiliary equipment. For example, the indication may comprise measurement information associated with the cell site auxiliary equipment. The E2 node may transmit the indication based on a trigger event or policy as described above with reference to FIG. 7.

In block 802, the near-RT RIC detects an event based on the received measurement information.

For example, in a VPP use case, the event may refer to a battery charge exceeding or being below a certain threshold, exceeding a power usage threshold, a battery failure event, etc.

As another example, for an air condition system RAN site function, the event may refer to exceeding or going below a temperature threshold, duty cycle percentage threshold, etc.

As another example, for a liquid cooling system RAN site function, the event may refer to a liquid flow metric being above or below a threshold, a leakage detector event, etc.

In block 803, the near-RT RIC performs an action based on the detected event. For example, the near-RT RIC may determine one or more commands for controlling the cell site auxiliary equipment.

In block 804, the near-RT RIC transmits a CONTROL message to the E2 node. The CONTROL message may comprise the one or more commands for controlling cell site auxiliary equipment (RAN site function). For example, the CONTROL message may indicate the detected event and a desired state of the cell site auxiliary equipment.

In block 805, the E2 node may apply the one or more commands for controlling the cell site auxiliary equipment.

Figure 8B:
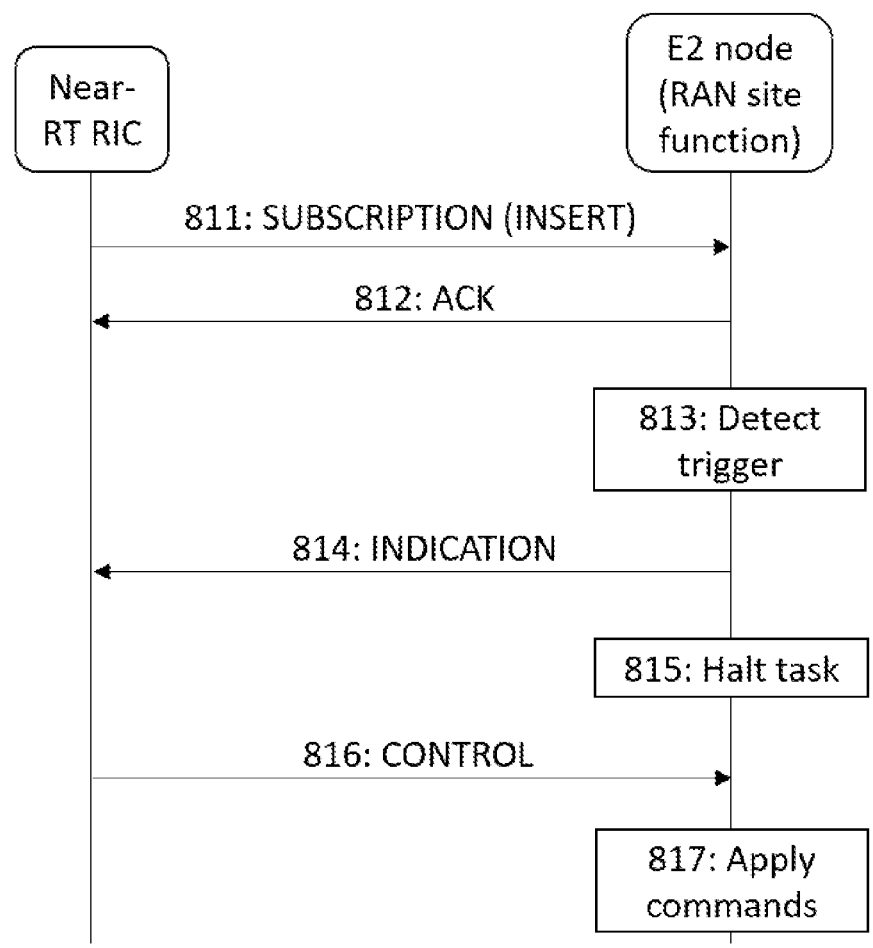
FIG. 8B illustrates a signaling diagram according to an example embodiment.

FIG. 8B illustrates a signaling diagram for an E2 INSERT procedure according to an example embodiment. The E2 INSERT procedure may be used to install a RIC service. In the E2 INSERT procedure, the E2 node may stops its processing of a task and ask the near-RT RIC for guidance on how to proceed. The near-RT RIC may provide the guidance for example via CONTROL.

Referring to FIG. 8B, in block 811, near-RT RIC transmits a E2 SUBSCRIPTION (INSERT) message to an E2 node comprising one or more RAN site functions. The RAN site function(s) may comprise cell site auxiliary equipment. For example, the E2 SUBSCRIPTION (INSERT) message may be used to set a trigger event, and to configure a corresponding INSERT in the RAN site function(s).

In block 812, the E2 node may transmit an acknowledgement (ACK) to the near-RT RIC to confirm successful reception of the E2 SUBSCRIPTION (INSERT) message.

In block 813, the E2 node detects a trigger event set by the subscription.

For example, in a VPP use case, the trigger event may refer to a battery charge exceeding or being below a certain threshold, exceeding a power usage threshold, a battery failure event, etc.

As another example, for an air condition system RAN site function, the event may refer to exceeding or going below a temperature threshold, duty cycle percentage threshold, etc.

As another example, for a liquid cooling system RAN site function, the event may refer to a liquid flow metric being above or below a threshold, a leakage detector event, etc.

In block 814, the E2 node transmits an E2 INDICATION to the near-RT RIC to inform the near-RT RIC about the detected trigger event. In other words, the E2 INDICATION carries the outcome of the installed RIC service.

In block 815, the E2 node may halt its processing of a task based on detecting the trigger event. For example, in the VPP use case, the E2 node may halt the charging or discharging of one or more batteries at the cell site.

In block 816, based on the received E2 INDICATION, the near-RT RIC transmits a CONTROL message to the E2 node. The CONTROL message may comprise one or more commands for controlling the cell site auxiliary equipment (the RAN site function). For example, in the VPP use case, the one or more commands may indicate to resume the charging or discharging.

In block 817, the E2 node may apply the one or more commands for controlling the cell site auxiliary equipment. For example, in the VPP use case, the E2 node may resume the charging or discharging, as indicated by the one or more commands.

Figure 9:
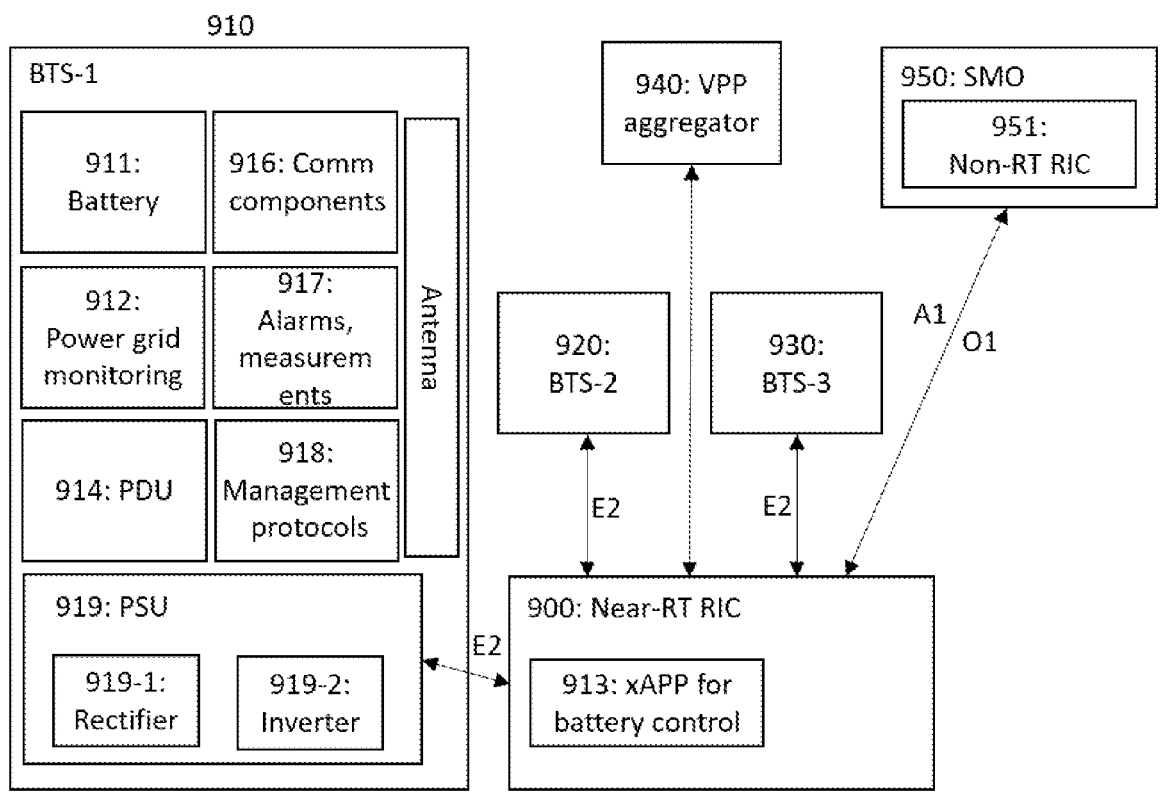
FIG. 9 illustrates an example of a system.

FIG. 9 illustrates an example of a system for the virtual power plant use case, to which some example embodiments may be applied. However, it should be noted that some example embodiments may also be applied to any other use case, where any RAN site function is controlled from an application.

Referring to FIG. 9, the system may comprise a near-RT RIC 900, a first base station 910, a VPP aggregator 940, and an SMO 950. The system may further comprise a second base station 920 and a third base station 930. The first base station 910 may correspond to the base station (access node) 104 of FIG. 1. The second base station 920 and third base station 930 may be, for example, neighbor base stations of the first base station 910.

The communication between the near-RT RIC 900 and a given base station 910, 920, 930 may occur via an E2 interface. The near-RT RIC 900 may further communicate with the SMO 950 via an O1 interface, and with the non-RT RIC 951 via an A1 interface.

The first base station 910 may comprise one or more batteries 911, a power supply unit (PSU) 919, a power distribution unit (PDU) 914, a power grid monitoring unit 912, communication components 916, a unit 917 for alarms and measurements, and/or management protocols 918.

In this example, the PSU 919 or the PDU 914 may be an E2 node or RAN site function configured to communicate with the near-RT RIC 900 via the E2 interface. The first base station 910 may be running on dedicated hardware, and the PSU 919 may be serving this hardware as well as the cell site auxiliary equipment. Alternatively, the baseband part of the first base station 910 may be implemented as an application in a cloud infrastructure, which may simultaneously serve also other applications.

The one or more batteries 911 may be configured as a back-up power source of the first base station 910 (e.g., in case of power outages). The one or more batteries 911 may also be used for VPP purposes.

The PSU 919 may be configured to supply electrical energy from a power grid via a rectifier 919-1 to operate the first base station 910 and/or to charge the one or more batteries 911. The PSU 919 may also be configured to discharge energy from the one or more batteries 911 to the power grid via an inverter 919-2. The inverter 919-2 is an electrical device or circuitry that converts direct current (DC) to alternating current (AC). The rectifier 919-1 is an electrical device or circuitry that converts AC to DC.

The PDU 914 may be configured to distribute electrical energy to the first base station 910, to or from the one or more batteries 911, and/or to or from the power grid via the PSU 919.

The PSU 919 or PDU 914 (depending on which one is the E2 node) may also be configured to provide PSU status information (e.g., power consumption information) and/or battery status information of the one or more batteries 919 as input data to the battery control xAPP 913 at the near-RT RIC 900. The PSU 919 or PDU 914 may be configured to communicate directly with the near-RT RIC 900, or the PSU 919 or PDU 914 may communicate with the near-RT RIC 900 via the first base station 910.

The power grid monitoring unit 912 may be configured to measure the frequency of the power grid and to provide the measurement information to the battery control xAPP 913 as input data for its decision-making. Alternatively, or additionally, the power grid monitoring unit 912 may be configured to receive commands or guidelines from a control system of the power grid or from another network element. The commands or guidelines may comprise, for example, one or more frequency boundaries for the power grid, wherein the one or more frequency boundaries indicate a threshold when to trigger the charging or discharging. The power grid monitoring unit 912 may be configured to indicate the one or more frequency boundaries to the battery control xAPP 913 as input data for its decision-making. As another example, the commands may comprise an explicit command to start or stop discharging the one or more batteries 911 to the power grid, or to start or stop operating the first base station 910 with battery power (instead of drawing energy from the power grid to operate the first base station 910).

The near-RT RIC 900 and/or the VPP aggregator 940 may be configured to obtain or receive input data from one or more external data sources, from the first base station 910, and/or from one or more neighbor base stations 920, 930. The near-RT RIC 900 may be configured to provide this data as input data to the battery control xAPP 913.

The one or more external data sources may comprise, for example, the internet, an electricity market, and/or the power grid control system of the power grid. The power grid control system may monitor and/or control the status (e.g., frequency) of the power grid, and, based on the monitoring, request the first base station 910 (e.g., via the battery control xAPP 913 or the power grid monitoring unit 912) to charge the one or more batteries 911 from the power grid, or to discharge energy from the one or more batteries 911 to the power grid via the inverter 919-2, or to operate the first base station 910 with battery power.

The VPP aggregator 940 is an entity that aggregates multiple power sources to one entity. The VPP aggregator 940 may also aggregate some non-telecommunication energy resources on the same pool. The VPP aggregator 940 may aggregate multiple small power reserves (e.g., companies, factories, shopping malls, base stations, etc., with batteries). The VPP aggregator 940 may be used to aggregate small power reserves so that a large enough power reserve can be provided to a power grid operator (e.g., Fingrid). In other words, the aggregation may mean combining smaller electricity production, consumption and storage sites that are capable of balancing into larger packages that can be offered on one or more electricity marketplaces. In addition, the VPP aggregator 940 may perform on-line validation of the timing and accuracy requirement of different power reserves before aggregation. The VPP aggregator 940 may also be configured to collect data from the one or more external data sources. Based on the collected data, the VPP aggregator 940 may be configured to transmit a request/command to the near-RT RIC 900 to start or stop discharging the one or more batteries 911 of the first base station 910. The near-RT RIC 900 may forward the request/command to the battery control xAPP 913.

The VPP aggregator 940 may be a cloud service, for example in a third-party cloud. The connection from the third-party cloud to the near-RT RIC 900 may be implemented, for example, through a transmission control protocol (TCP) port or user datagram protocol (UDP) port over the internet. The protocol itself may be encrypted or isolated. The cloud service may use managed/serverless solutions like message brokers and queues, for example MQ telemetry transport (MQTT).

The near-RT RIC 900 may also be configured to communicate with a power network operator. Fingrid is one example of a power network operator. For example, the near-RT RIC 900 may communicate with the power network operator for trading bids and reporting how much and when regulation happened. Also, the power network operator bids may deal power in megawatt (MW) granularity, for example. For this reason, a third-party or fourth-party energy trading broker that hides financial issues may be used.

The battery control xAPP 913 at the near-RT RIC 900 may be configured to control the use (e.g., charging and/or discharging) of the one or more batteries 911 of the first base station 910.

The charging means that the one or more batteries 911 are charged with energy provided from the power grid via the PSU 919.

The discharging may mean that the one or more batteries 911 are used as a power source to operate the first base station 910 (instead of using the power grid as the power source), or that the one or more batteries 911 are discharged to the power grid via the inverter 919-2 for a certain time and energy amount. Alternatively, the discharging may mean that the one or more batteries 911 of the first base station 910 are discharged to the second base station 920 for a certain time and energy amount (e.g., to operate the second base station or to charge one or more batteries of the second base station).

The battery control xAPP 913 may be a decision-making entity that is configured to determine, based on a set of input data, a time and an energy amount for charging or discharging the one or more batteries 911 of the first base station 910. The set of input data may comprise input data from various data sources. For example, the battery control xAPP 913 may change the mode (charge/discharge) of the PDU 914 or PSU 919 based on input data, boundary conditions, and/or commands from the power grid monitoring unit 912, and/or from the VPP aggregator 940. Based on the input data, the battery control xAPP 913 may determine the optimal time and energy amount for charging or discharging the one or more batteries 911. The determination may be based on one or more pre-defined rules and/or a machine learning model or some other model.

The battery control xAPP 913 may transmit an indication/command/message to the PDU 914 or PSU 919 to perform the actual charging or discharging of the one or more batteries 911 according to the determined time and energy amount.

The set of input data used by the battery control xAPP 913 may comprise, for example, one or more battery operation policies, dynamic data (e.g., social media data, weather forecast information, etc.), electricity market information, a request for charging or discharging from the VPP aggregator or the electricity market, power grid monitoring information from the power grid monitoring unit 912, network status and configuration information associated with the first base station 910, historical information associated with power consumption of the first base station 910, PSU status information provided by the PDU 914 or PSU 919, and/or battery status information provided by the PDU 914 or PSU 919.

The one or more battery operation policies may comprise, for example, one or more VPP policies provided by a VPP operator, and/or a regulatory requirement for a minimum time for being able to operate the first base station 910 with the one or more batteries 911. As an example, a VPP policy may indicate a minimum time duration (e.g., 30 minutes) for participating in the VPP market, i.e., a minimum time duration for discharging the one or more batteries 911 to the power grid.

The power grid monitoring information may comprise, for example, one or more measured frequency values and/or frequency boundaries of the power grid provided by the power grid monitoring unit 912.

The input data from the VPP aggregator 940 may comprise, for example, a power control command indicating whether to discharge (start/stop discharging) the one or more batteries 911 of the first base station 910.

The dynamic data, the one or more battery operation policies, and/or the electricity market information may be obtained, for example, by the near-RT RIC 900 (e.g., from the one or more external data sources), and the near-RT RIC 900 may provide this input data to the battery control xAPP 913. Alternatively, the near-RT RIC 900 may determine one or more boundary conditions for the battery control xAPP 913 based on at least the input data obtained from the one or more external data sources, and the near-RT RIC 900 may provide the one or more boundary conditions to the battery control xAPP 913 to be used for decision-making at the battery control xAPP 913.

The near-RT RIC 900 may determine the one or more boundary conditions or order the first base station 910 to discharge in such a way that the charge level of the one or more batteries 911 remains sufficient to serve user devices as dictated by the regulatory requirements. For example, the near-RT RIC 900 may predict or estimate data traffic volume, number of user devices, etc., for the time of the day/week/month, and therefore the needed battery charge level, based on data traffic forecasts/profiles and battery status information.

The network status and configuration information may comprise, for example configuration management (CM) data of the wireless communication network, fault management (FM) data of the wireless communication network, performance management (PM) data of the wireless communication network, log data of the wireless communication network, data traffic volume of the first base station 910, cell load of the first base station 910, a number of active user devices associated with the first base station 910 (e.g., number of active UEs in a cell provided by the first base station), a health status of the first base station 910, and/or historical information associated with data traffic of the first base station 910. The health status of the first base station 910 indicates whether there are fault management alarms (service-related alarms) associated with the first base station 910. For example, the discharging may not be allowed, if the health status is not good enough.

Alternatively, or in addition to the battery status information and data traffic status of the first base station 910, the near-RT RIC may receive requests from the VPP aggregator 940, or the electricity market, or the control system of the power grid to discharge energy from the one or more batteries 911 to the power grid according to a certain amount of energy and/or a certain amount of time. Alternatively, or additionally, the near-RT RIC 900 may receive electricity price information from the electricity market, based on which the battery control xAPP 913 may autonomously decide the time and energy amount to be charged or discharged. The electricity price information may be an indicator for energy demand in the power grid. For example, when the electricity price is high, then this may indicate that the power grid may need additional energy sources to avoid overloading the power grid.

The actual energy amount for discharge or battery use may be based on, for example, both BTS data (e.g., battery status information and data traffic forecast or profile) as well as electricity market information (e.g., request to discharge energy to the power grid).

Some example embodiments may also provide dynamic behaviour of the control mechanism allowing the change of charge/discharge state during the set VPP policy. This means that even if the battery resource of some specific base station has already been dedicated for VPP use, it may be possible to revert the discharge command to cancel discharging the battery to the power grid (assuming that an inverter is used for this purpose). This may be needed in order to save the battery for its primary use, i.e., as back-up power for the base station. The discharge may be cancelled, for example, if some BTS alarms arise, or if the data traffic is expected to grow more than previously anticipated.

Some example embodiments may also enable smart allocation of battery resources. For example, if the requirement set by the transmission system operator (TSO) for participation into the VPP market is 30 minutes (i.e., the battery should be discharged into the power grid for at least 30 minutes), it may be possible to re-allocate or split this 30 minutes into multiple smaller time slots, such as six 5-minute time slots. Thus, the overall 30-minute requirement may be reached by combining these six 5-minute time slots. For example, the six 5-minute time slots may be divided between six different base stations by allocating one 5-minute time slot per base station. Using these smaller time slots may help in fulfilling the regulatory requirements (e.g., minimum 2-4 hour BTS operation time when using the back-up battery), since the amount of energy consumed in 5 minutes is rather small (compared to 30 minutes).

There may also be setups, where several of the mentioned solutions are implemented in parallel, and roles and tasks are divided between different entities.

Figure 10:
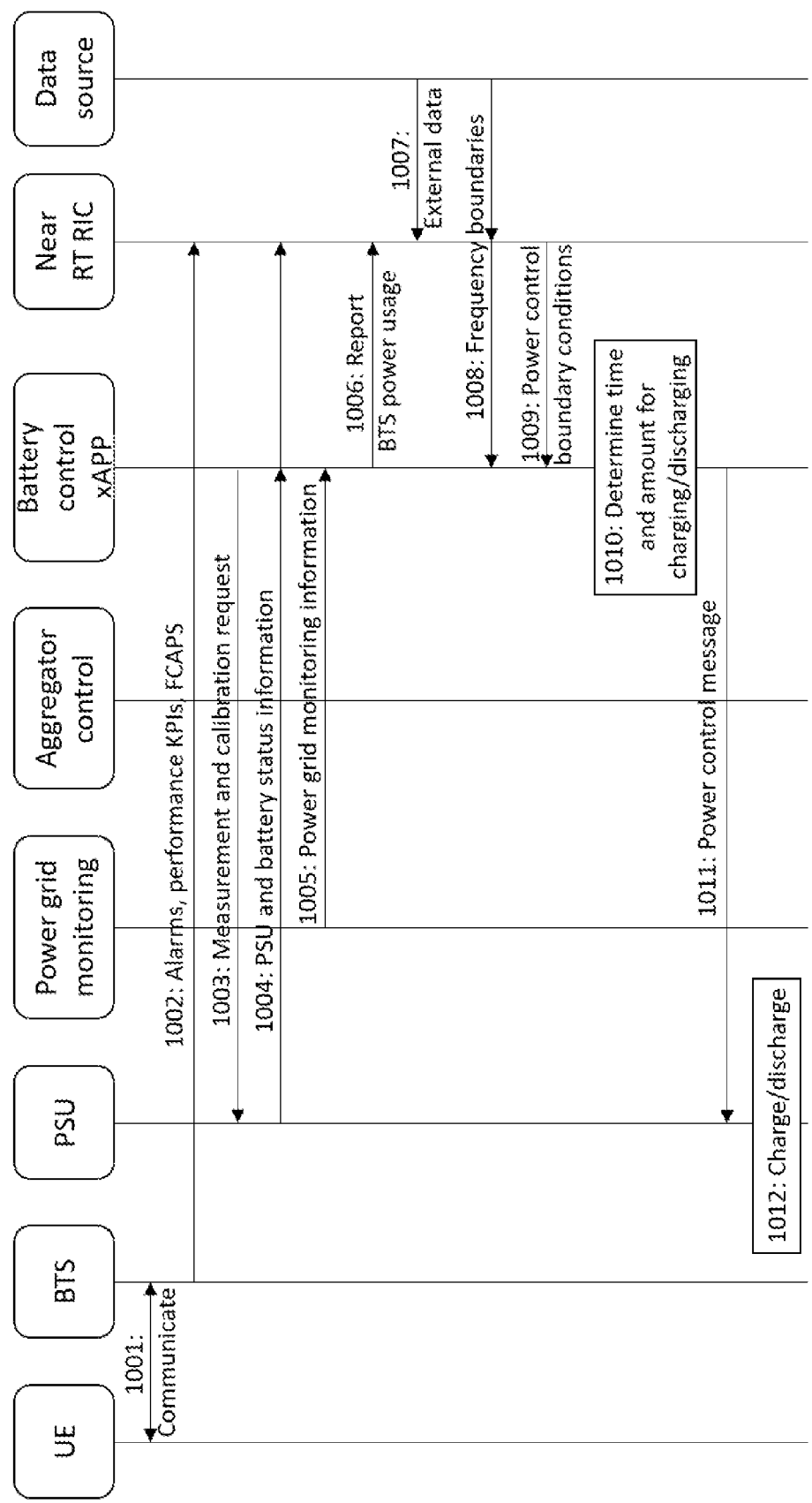
FIG. 10 illustrates a signaling diagram according to an example embodiment.

FIG. 10 illustrates a signaling diagram for the VPP use case according to an example embodiment.

Referring to FIG. 10, in block 1001, a base station communicates with one or more user devices.

In block 1002, the base station transmits, to a near-RT RIC, information about its current data traffic status. This information may comprise, for example, a health status of the base station, one or more alarms associated with the base station, one or more performance KPIs associated with the base station, and/or FCAPS information associated with the base station.

FCAPS (fault, configuration, accounting, performance, security) refers to network management tasks. They are related to the safe use of the VPP scheme. A prerequisite may be that the VPP use does not conflict with the primary network tasks of the base station. When it comes to actual VPP functionality, FCAPS may support it by providing information on alarms, and KPIs impacting the potential for VPP use. In addition to that, the battery type (lead-acid/Li-ion, nominal capacity) and condition (state of charge, how many cyclic loads can be safely run) of the one or more batteries of the base station dictate the potential amount of energy and for how long energy can be released (discharged) for VPP use. Also, the power supply type may impact the VPP use case. The power supply type may indicate, for example, whether the PSU of the base station comprises an inverter or not.

In block 1003, a battery control xAPP at the near-RT RIC transmits a measurement and calibration request to a power supply unit (PSU) of the base station via an E2 interface. Herein the PSU may be considered to be an E2 node. The measurement and calibration request may comprise, for example, a request for PSU status information of a PSU of the base station, and/or battery status information of the one or more batteries of the base station.

In block 1004, the power supply unit transmits, to the battery control xAPP, via the E2 interface, a measurement and calibration report comprising the PSU status information and/or the battery status information. Herein the PSU status information and/or the battery status information may also be referred to as measurement information. The measurement and calibration report may be transmitted periodically or in response to the measurement and calibration request from the battery control xAPP. In other words, the measurement and calibration request of block 1003 may be optional, in case the measurement and calibration report is transmitted periodically.

Alternatively, or additionally, the PSU may transmit the PSU status information and/or the battery status information to the near-RT RIC, or the battery control xAPP may forward the PSU status information and/or the battery status information to the near-RT RIC.

The PSU status information may indicate power consumption of the base station.

The battery status information may comprise (indicate), for example, a state of charge (SOC) of the one or more batteries, a state of health (SOH) of the one or more batteries, a battery capacity (e.g., in kWh) of the one or more batteries, and/or a voltage of the one or more batteries.

In block 1005, a power grid monitoring unit transmits power grid monitoring information to the battery control xAPP. The power grid monitoring information may comprise, for example, one or more measured frequency values of a power grid connected to the base station.

In block 1006, the battery control xAPP transmits, to the near-RT RIC, a report indicating power usage (i.e., power consumption) of the base station. For example, the report may comprise historical information associated with power consumption of the base station. The historical information may be based at least partly on the PSU status information received from the PSU.

Reporting the power usage of the base station may be needed in order for the near-RT RIC to know the amount of energy (power consumption amount) that this specific base station is using. The report may comprise, for example, average, weekly, daily, hourly, or quarter-hourly (15 min) information indicating how much energy is consumed and/or available in normal use of this base station.

In block 1007, the near-RT RIC receives external data from one or more external data sources, such as the internet, electricity market, VPP aggregator, power grid control system, and/or one or more neighbor base stations.

The external data may comprise, for example, one or more battery operation policies, such as a regulatory requirement in the area, where the base station is located in. The regulatory requirement indicates a minimum time for being able to operate the base station with the one or more batteries.

Alternatively, or additionally, the external data may comprise dynamic data such as events, social media data, weather forecast information, data traffic load at different times of the day/week/month/year, and so on.

Alternatively, or additionally, the external data may comprise network status information from the one or more neighbor base stations.

Alternatively, or additionally, the external data may comprise a request from the VPP aggregator to start or stop discharging the one or more batteries.

Alternatively, or additionally, the external data may comprise electricity market information. The electricity market information may also be referred to as energy market information. For example, the electricity market may transmit a request for charging or discharging the one or more batteries. The electricity market information may be based on information on the contractual framework (FFR/FCR/etc.), some agreed service-level agreements (SLAs), such as the (e.g., weekly) amount of required energy, the required response time to the request, and the duration of back-up battery use. The electricity market information may also comprise electricity price information as an indicator of energy demand in the power grid. FFR is an abbreviation for fast frequency reserve. FCR is an abbreviation for frequency containment reserve.

In block 1008, the near-RT RIC receives one or more frequency boundaries (thresholds) for the power grid frequency from at least one of the one or more external data sources, such as the internet, electricity market, power grid control system and/or VPP aggregator.

For example, the VPP aggregator or the electricity market may set upper and lower boundaries for the allowed frequency in the power grid.

The VPP aggregator or electricity market may also set more detailed guidelines, such as the number of frequency measurements above or below the one or more frequency boundaries that trigger the VPP functionality (charging or discharging).

For example, in block 1008, the VPP aggregator or electricity market may indicate the one or more frequency boundaries to the near-RT RIC, which may then forward them to relevant base station(s) (e.g., to the battery control xAPP of the base station). Relevant base stations may be those, where the data traffic situation allows discharging batteries to the power grid.

Alternatively, the VPP aggregator or electricity market may indicate the one or more frequency boundaries directly to the base station (e.g., to the aggregator control unit of the base station, which may forward them to the battery control xAPP).

In block 1009, the near-RT RIC indicates one or more power control boundary conditions to the battery control xAPP. As the near-RT RIC may have the best knowledge of the overall status of the wireless communication network, it may provide the base station (e.g., the battery control xAPP) with one or more boundary conditions indicating, for example, when the batteries can be discharged (e.g., time of day), the minimum battery level, and/or maximum energy amount that can be discharged.

The near-RT RIC may determine the one or more power control boundary conditions in such a way that the charge level of the one or more batteries remains sufficient to serve user devices as dictated by the regulatory requirements on how long the base station needs to be able to operate using the one or more batteries (e.g., in case of power outages). For example, the near-RT RIC may predict or estimate data traffic volume, number of user devices, etc., for the time of the day/week/month, and therefore the needed battery charge level, based on data traffic forecasts/profiles and battery status information.

The one or more power control boundary conditions may also be based on information on how the time of day impacts the actual battery capacity that needs to be available after active battery use. For example, during times of low data traffic, it may be possible to operate the base station longer using the one or more batteries. On the other hand, during times of high data traffic, the use (discharging) of the one or more batteries may be forbidden.

The one or more power control boundary conditions may also be based on a holistic view on the energy use of the wireless communication network. For example, battery storage capacity at the one or more neighbor base stations may allow a larger share of battery capacity to be used for VPP (e.g., discharging to the power grid) at this particular base station, if the one or more neighbor base stations can participate in serving the data traffic during the VPP use of this particular base station.

In block 1010, the battery control xAPP determines, based on at least the one or more power control boundary conditions, the one or more frequency boundaries, and the set of input data received in blocks 1004 and 1005, a time and an energy amount for charging or discharging the one or more batteries of the base station. For example, the determination may be made by applying one or more pre-defined rules to the set of input data according to the one or more power control boundary conditions and the one or more frequency boundaries. The one or more frequency boundaries may be based on the nominal frequency of the power grid.

For example, the measured power grid frequency (power grid monitoring information) may be used to control the VPP use (charging/discharging). This may be done by triggering the VPP use, when the measured power grid frequency is larger or smaller than the nominal frequency (e.g., 50 Hz) of the power grid. If the measured frequency is smaller than the nominal frequency, then it may be a good time to start using the one or more batteries to operate the base station, and/or to support the power grid by discharging the one or more batteries through an inverter. If the measured frequency is larger than the nominal frequency, then it may be a good time to start charging the one or more batteries from the power grid.

Alternatively, the power grid frequency may be used as an indicator that helps the battery control xAPP to start preparing for VPP use. VPP use may require very fast response times, and thus using the power grid frequency as a preemptive indicator may ensure that there is enough time to react, when the actual request for discharging comes from the electricity market or VPP aggregator, and thus the SLAs may be fulfilled.

In block 1011, the battery control xAPP transmits a power control message to the power supply unit via the E2 interface. The power control message may comprise, for example, an indication/command for the PSU to charge or discharge the one or more batteries of the base station according to the determined time and energy amount.

In block 1012, the PSU charges or discharges the one or more batteries according to the received indication/command.

Table 2 below presents examples of commands and parameters that may be comprised in the power control message (block 1011) from the battery control xAPP to the PSU (or PDU). These commands may be triggered based on signaled inputs for PSU and battery status (from PSU or PDU), and power grid status (from power grid monitoring unit). With these commands, battery modes, power grid modes and inverter modes can be controlled as shown in Table 2. These commands may be carried, for example, in E2 POLICY or E2 CONTROL messages. E2 CONTROL provides a way to deliver a direct command, while use of E2 POLICY enables to (optionally) define conditions under which the action is to be taken.

TABLE 2

| Power control message | Parameters |
| --- | --- |
| Battery command | Mode (charge \| discharge \| standby), amount |
| Power grid command | Mode (on \| off) |
| Inverter | Mode (on \| off) |

Table 3 below presents examples of the states of the one or more batteries, the power grid, and the inverter at the PSU (or PDU) based on commands transmitted to the PSU (or PDU) from the battery control xAPP (i.e., based on the commands and parameters presented in Table 2).

TABLE 3

| Battery | Power grid | Inverter | Description |
| --- | --- | --- | --- |
| Charge | On | Off | Operate BTS from power grid and charge battery |
| Discharge | Off | Off | Operate BTS on battery |
| Discharge | On | On | Operate BTS on battery and discharge energy to power grid |
| Standby | On | Off | Operate BTS from power grid and do not charge battery |

Use of E2 REPORT enables the power supply system, or any other RAN site function, to carry measurement and/or calibration information, as listed in Tables 4 and 5 below.

Table 4 below presents examples of the parameters in the measurement and calibration request (block 1003) that may be transmitted to the PDU from the battery control xAPP.

TABLE 4

| Request | Parameters |
| --- | --- |
| Measurement | SOC, SOH, battery capacity, voltage and measurement-specific parameters |
| Calibration | Voltage, reference values |

Table 5 below presents examples of the parameters in the measurement and calibration report (block 1004), which may be transmitted from the PSU (or PDU) to the battery control xAPP (e.g., periodically or in response to the measurement and calibration request).

TABLE 5

| Report | Parameters |
| --- | --- |
| Measurement report | SOC, SOH, battery capacity, voltage and measurement-specific parameters |
| Calibration report | Successful | failed with reason |

Figure 11:
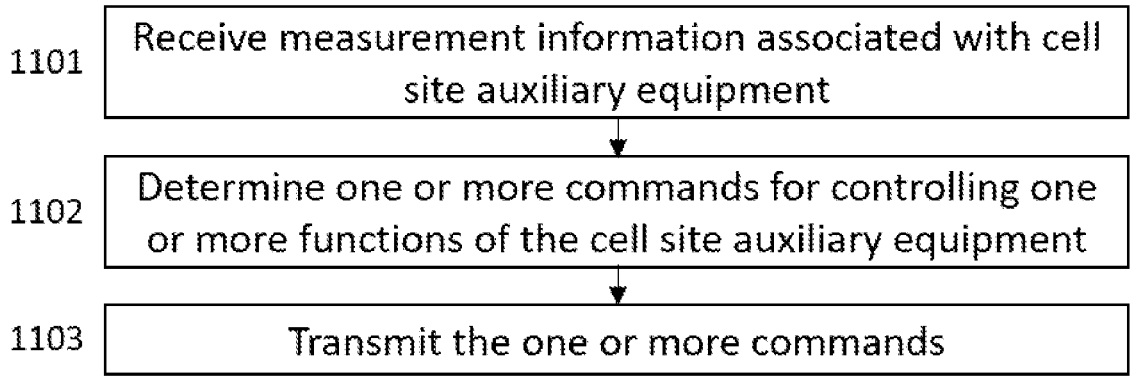
FIG. 11 illustrates a flow chart according to an example embodiment.

FIG. 11 illustrates a flow chart according to an example embodiment of a method performed by an apparatus. For example, the apparatus may be an apparatus such as, or comprising, or comprised in, a near-real-time radio intelligent controller (near-RT RIC), or any other communication device.

Referring to FIG. 11, in block 1101, measurement information associated with cell site auxiliary equipment is received, wherein the measurement information comprises at least one of the following: status metrics and/or performance metrics associated with the cell site auxiliary equipment. In addition to the auxiliary equipment, the cell site may also comprise a base station of a radio access network.

For example, the cell site auxiliary equipment may comprise at least one of the following: a power supply system at the cell site, a temperature control system at the cell site, an air conditioning system at the cell site, a liquid cooling system at the cell site, transport network equipment at the cell site, a motion detector at the cell site, a camera at the cell site, a drone charging station at the cell site, a radar at the cell site, a lidar at the cell site, a positioning device at the cell site, a diesel power generator at the cell site, a solar panel at the cell site, jamming or anti-jamming equipment at the cell site, a door sensor at the cell site, an earthquake sensor at the cell site, an air pollution sensor at the cell site, a wind meter at the cell site, a temperature sensor at the cell site, a humidity sensor at the cell site, a leakage indicator at the cell site, a corrosion sensor at the cell site, an actuator at the cell site, an intrusion alarm system at the cell site, or a fire alarm system at the cell site.

In block 1102, the apparatus determines, based at least partly on the measurement information, one or more commands for controlling one or more functions of the cell site auxiliary equipment. The one or more functions may refer to one or more RAN site functions described above.

In block 1103, the one or more commands are transmitted to the cell site auxiliary equipment. An E2 interface is used for at least one of the following: receiving at least a part of the measurement information, and/or transmitting the one or more commands.

The connection between the apparatus and the cell site auxiliary equipment may be established by using an E2 setup procedure, as described above with reference to FIG. 4. The measurement information may be received and/or the one or more commands may be transmitted using the connection established with the E2 setup procedure.

The measurement information may be received, for example, by using an E2 report service of the E2 interface, or an E2 insert service of the E2 interface, with an E2 service model comprising status information elements and status metrics associated with the one or more functions. The use of the E2 report service is described above with reference to FIG. 7. The use of the E2 insert service is described above with reference to FIG. 8B.

The one or more commands may be transmitted, for example, by using an E2 policy service of the E2 interface, or an E2 control service of the E2 interface, with an E2 service model comprising controllable parameters and policies associated with the one or more functions. The use of the E2 policy service is described above with reference to FIG. 7. The use of the E2 control service is described above with reference to FIG. 8A and FIG. 8B.

In one example, as described above with reference to FIG. 10, if the cell site auxiliary equipment comprises the power supply system, then determining the one or more commands may mean that the apparatus determines, based at least partly on the measurement information, a time and an energy amount for charging or discharging one or more batteries of the cell site, wherein the discharging comprises discharging energy from the one or more batteries to a power grid, or discharging energy from the one or more batteries to operate a base station at the cell site with battery power. In this case, the measurement information may comprise at least one of the following: a state of charge of the one or more batteries, a state of health of the one or more batteries, and/or battery capacity information of the one or more batteries. The one or more commands may indicate to charge or discharge the one or more batteries according to the determined time and energy amount.

Figure 12:
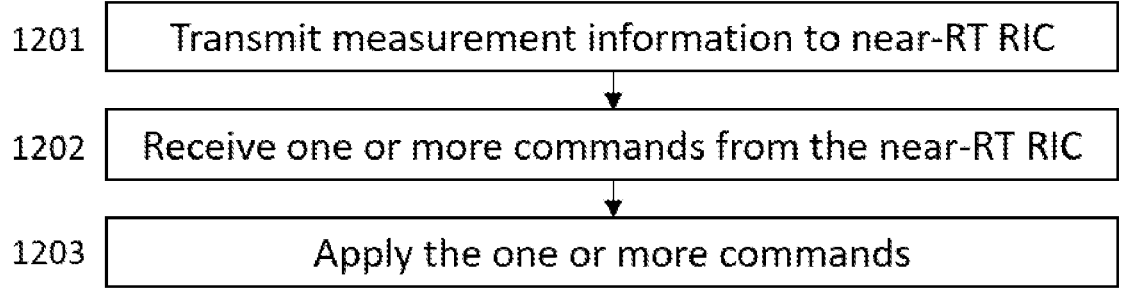
FIG. 12 illustrates a flow chart according to an example embodiment.

FIG. 12 illustrates a flow chart according to an example embodiment of a method performed by an apparatus. For example, the apparatus may be an apparatus such as, or comprising, or comprised in, a base station, an E2 node, cell site auxiliary equipment, or any other communication device.

Referring to FIG. 12, in block 1201, measurement information is transmitted to a near-real-time radio intelligent controller, wherein the measurement information comprises at least one of the following: status metrics and/or performance metrics associated with cell site auxiliary equipment. In addition to the auxiliary equipment, the cell site may also comprise a base station of a radio access network.

For example, the cell site auxiliary equipment may comprise at least one of the following: a power supply system at the cell site, a temperature control system at the cell site, an air conditioning system at the cell site, a liquid cooling system at the cell site, transport network equipment at the cell site, a motion detector at the cell site, a camera at the cell site, a drone charging station at the cell site, a radar at the cell site, a lidar at the cell site, a positioning device at the cell site, a diesel power generator at the cell site, a solar panel at the cell site, jamming or anti-jamming equipment at the cell site, a door sensor at the cell site, an earthquake sensor at the cell site, an air pollution sensor at the cell site, a wind meter at the cell site, a temperature sensor at the cell site, a humidity sensor at the cell site, a leakage indicator at the cell site, a corrosion sensor at the cell site, an actuator at the cell site, an intrusion alarm system at the cell site, or a fire alarm system at the cell site.

In block 1202, one or more commands for controlling one or more functions of the cell site auxiliary equipment receiving are received from the near-real-time radio intelligent controller. An E2 interface is used for at least one of the following: transmitting at least a part of the measurement information, and/or receiving the one or more commands.

In block 1203, the one or more commands are applied for controlling the one or more functions of the cell site auxiliary equipment.

The connection between the apparatus and the near-RT RIC may be established by using an E2 setup procedure, as described above with reference to FIG. 4. The measurement information may be transmitted and/or the one or more commands may be received using the connection established with the E2 setup procedure.

The measurement information may be transmitted, for example, by using an E2 report service of the E2 interface, or an E2 insert service of the E2 interface, with an E2 service model comprising status information elements and status metrics associated with the one or more functions. The use of the E2 report service is described above with reference to FIG. 7. The use of the E2 insert service is described above with reference to FIG. 8B.

The one or more commands may be received, for example, by using an E2 policy service of the E2 interface, or an E2 control service of the E2 interface, with an E2 service model comprising controllable parameters and policies associated with the one or more functions. The use of the E2 policy service is described above with reference to FIG. 7. The use of the E2 control service is described above with reference to FIG. 8A and FIG. 8B.

The blocks, related functions, and information exchanges (messages) described above by means of FIGS. 4-8 and 10-12 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 13:
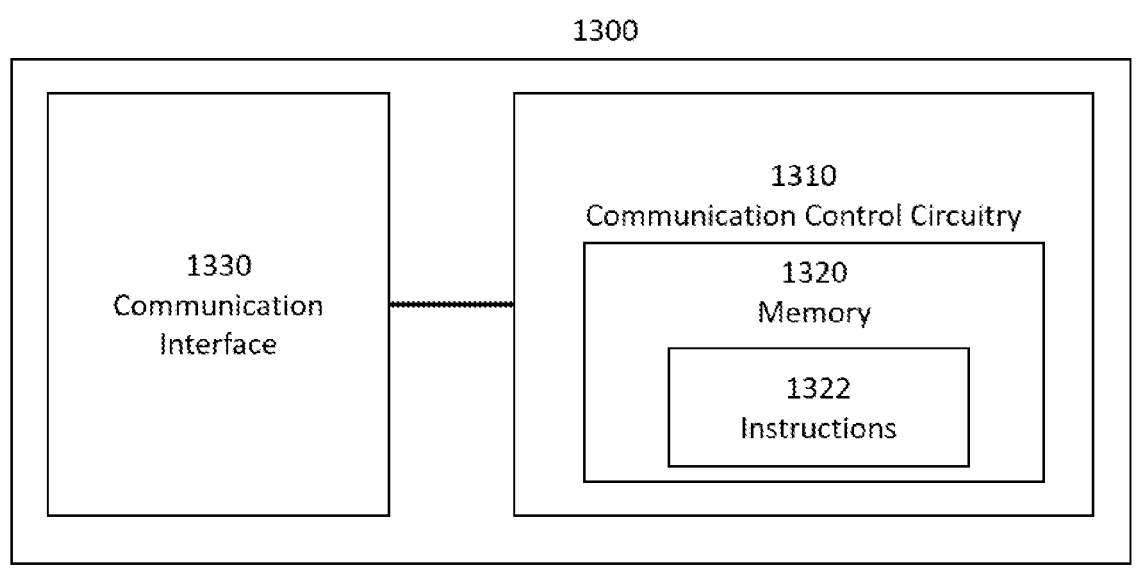
FIG. 13 illustrates an example of an apparatus.

FIG. 13 illustrates an example of an apparatus 1300 comprising means for performing one or more of the example embodiments described above. For example, the apparatus 1300 may be an apparatus such as, or comprising, or comprised in, a near-real-time radio intelligent controller (near-RT RIC), a base station, an E2 node, cell site auxiliary equipment, or any other communication device.

The apparatus 1300 may comprise, for example, a circuitry or a chipset applicable for realizing one or more of the example embodiments described above. The apparatus 1300 may be an electronic device comprising one or more electronic circuitries. The apparatus 1300 may comprise a communication control circuitry 1310 such as at least one processor, and at least one memory 1320 storing instructions 1322 which, when executed by the at least one processor, cause the apparatus 1300 to carry out one or more of the example embodiments described above. Such instructions 1322 may, for example, include a computer program code (software), wherein the at least one memory and the computer program code (software) are configured, with the at least one processor, to cause the apparatus 1300 to carry out one or more of the example embodiments described above. The at least one processor and the at least one memory storing the instructions may provide the means for providing or causing the performance of any of the methods and/or blocks described above.

The processor is coupled to the memory 1320. The processor is configured to read and write data to and from the memory 1320. The memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (Tx) and at least one receiver (Rx) that may be integrated to the apparatus 1300 or that the apparatus 1300 may be connected to. The communication interface 1330 may provide means for performing some of the blocks for one or more example embodiments described above. The communication interface 1330 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1330 provides the apparatus with radio communication capabilities to communicate in the cellular communication system. The communication interface may, for example, provide a radio interface to one or more user devices. The apparatus 1300 may further comprise another interface towards a core network such as the network coordinator apparatus or AMF, and/or to the access nodes of the cellular communication system.

It is to be noted that the apparatus 1300 may further comprise various components not illustrated in FIG. 13. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus, comprising:
   at least one processor; and
   at least one memory storing instructions which, when executed by the at least one processor, cause the apparatus at least to:
   receive measurement information associated with cell site auxiliary equipment, wherein the measurement information comprises at least one of the following: status metrics or performance metrics associated with the cell site auxiliary equipment;
   determine, based at least partly on the measurement information, a time and an energy amount for charging or discharging one or more batteries of the cell site auxiliary equipment, wherein the discharging comprises discharging energy from the one or more batteries to a power grid, or discharging energy from the one or more batteries to operate a base station at the cell site auxiliary equipment with battery power,
   wherein the measurement information comprises at least one of the following: a state of charge of the one or more batteries, a state of health of the one or more batteries, or battery capacity information of the one or more batteries;
   determine, based at least partly on the measurement information, one or more commands for controlling one or more functions of the cell site auxiliary equipment, wherein the one or more commands indicate to charge or discharge the one or more batteries according to the determined time and energy amount; and
   transmit the one or more commands to the cell site auxiliary equipment,
   wherein an E2 interface is used for at least one of the following: receiving at least a part of the measurement information, or transmitting the one or more commands.

2. The apparatus according to claim 1, wherein the cell site auxiliary equipment comprises at least one of the following: a power supply system, a temperature control system, an air conditioning system, a liquid cooling system, transport network equipment, a motion detector, a camera, a drone charging station, a radar, a lidar, a positioning device, a diesel power generator, a solar panel, jamming or anti-jamming equipment, a door sensor, an earthquake sensor, an air pollution sensor, a wind meter, a temperature sensor, a humidity sensor, a leakage indicator, a corrosion sensor, an actuator, an intrusion alarm system, or a fire alarm system.

3. The apparatus according to claim 1, wherein the one or more commands are transmitted by using an E2 policy service or an E2 control service of the E2 interface, with an E2 service model comprising controllable parameters and policies associated with the one or more functions.

4. The apparatus according to claim 1, wherein the measurement information is received by using an E2 report service or an E2 insert service of the E2 interface, with an E2 service model comprising status information elements and status metrics associated with the one or more functions.

5. The apparatus according to claim 1, wherein the instructions, when executed by the at least one processor, further cause the apparatus to:
 receive, from the cell site auxiliary equipment, an E2 setup request message comprising at least a list of functions supported by the cell site auxiliary equipment; and
 transmit, to the cell site auxiliary equipment, based on the E2 setup request message, an E2 setup message for establishing a connection between the apparatus and the cell site auxiliary equipment, wherein the E2 setup message comprises at least a list of accepted functions to be enabled by the cell site auxiliary equipment,
 wherein the measurement information is received and the one or more commands are transmitted using the connection established with the E2 setup message.

6. The apparatus according to claim 1, wherein the instructions, when executed by the at least one processor, further cause the apparatus to:
 transmit, to the cell site auxiliary equipment, an E2 subscription request message for installing a policy or a trigger event at the cell site auxiliary equipment for reporting the measurement information.

7. The apparatus according to claim 1, wherein the instructions, when executed by the at least one processor, further cause the apparatus to:
 receive, from the cell site auxiliary equipment, by using a radio intelligent controller service update procedure or an E2 node configuration update procedure of the E2 interface, at least one of the following: updated configuration information of the cell site auxiliary equipment, or updated capability information of the cell site auxiliary equipment.

8. The apparatus according to claim 1, wherein the apparatus comprises, or is comprised in, a near-real-time radio intelligent controller.

9. An apparatus, comprising:
 at least one processor; and
 at least one memory storing instructions which, when executed by the at least one processor, cause the apparatus at least to:
 transmit measurement information to a near-real-time radio intelligent controller, wherein the measurement information comprises at least one of the following: status metrics or performance metrics associated with cell site auxiliary equipment;
 receive, from the near-real-time radio intelligent controller, one or more commands for controlling one or more functions of the cell site auxiliary equipment, wherein the one or more commands indicate to charge or discharge one or more batteries of the cell site auxiliary equipment according to a determined time and energy amount for charging or discharging the one or more batteries,
 wherein an E2 interface is used for at least one of the following: transmitting at least a part of the measurement information, or receiving the one or more commands; and
 apply the one or more commands for controlling the one or more functions of the cell site auxiliary equipment.

10. The apparatus according to claim 9, wherein the cell site auxiliary equipment comprises at least one of the following: a power supply system, a temperature control system, an air conditioning system, a liquid cooling system, transport network equipment, a motion detector, a camera, a drone charging station, a radar, a lidar, a positioning device, a diesel power generator, a solar panel, jamming or anti-jamming equipment, a door sensor, an earthquake sensor, an air pollution sensor, a wind meter, a temperature sensor, a humidity sensor, a leakage indicator, a corrosion sensor, an actuator, an intrusion alarm system, or a fire alarm system.

11. A method comprising:
 receiving measurement information associated with cell site auxiliary equipment, wherein the measurement information comprises at least one of the following: status metrics or performance metrics associated with the cell site auxiliary equipment;
 determining, based at least partly on the measurement information, a time and an energy amount for charging or discharging one or more batteries of the cell site auxiliary equipment, wherein the discharging comprises discharging energy from the one or more batteries to a power grid, or discharging energy from the one or more batteries to operate a base station at the cell site auxiliary equipment with battery power,
 wherein the measurement information comprises at least one of the following: a state of charge of the one or more batteries, a state of health of the one or more batteries, or battery capacity information of the one or more batteries;
 determining, based at least partly on the measurement information, one or more commands for controlling one or more functions of the cell site auxiliary equipment, wherein the one or more commands indicate to charge or discharge the one or more batteries according to the determined time and energy amount; and
 transmitting the one or more commands to the cell site auxiliary equipment,
 wherein an E2 interface is used for at least one of the following: receiving at least a part of the measurement information, or transmitting the one or more commands.

12. A method comprising:
 transmitting measurement information to a near-real-time radio intelligent controller, wherein the measurement information comprises at least one of the following: status metrics or performance metrics associated with cell site auxiliary equipment;
 receiving, from the near-real-time radio intelligent controller, one or more commands for controlling one or more functions of the cell site auxiliary equipment, wherein the one or more commands indicate to charge or discharge one or more batteries of the cell site auxiliary equipment according to a determined time and energy amount for charging or discharging the one or more batteries, wherein an E2 interface is used for at least one of the following: transmitting at least a part of the measurement information, or receiving the one or more commands; and applying the one or more commands for controlling the one or more functions of the cell site auxiliary equipment.

13. A non-transitory computer readable medium comprising program instructions which, when executed by an apparatus, cause the apparatus to perform at least the following:

receiving measurement information associated with cell site auxiliary equipment, wherein the measurement information comprises at least one of the following: status metrics or performance metrics associated with the cell site auxiliary equipment;

determining, based at least partly on the measurement information, a time and an energy amount for charging or discharging one or more batteries of the cell site auxiliary equipment, wherein the discharging comprises discharging energy from the one or more batteries to a power grid, or discharging energy from the one or more batteries to operate a base station at the cell site auxiliary equipment with battery power, wherein the measurement information comprises at least one of the following: a state of charge of the one or more batteries, a state of health of the one or more batteries, or battery capacity information of the one or more batteries;

determining, based at least partly on the measurement information, one or more commands for controlling one or more functions of the cell site auxiliary equipment, wherein the one or more commands indicate to charge or discharge the one or more batteries according to the determined time and energy amount; and transmitting the one or more commands to the cell site auxiliary equipment, wherein an E2 interface is used for at least one of the following: receiving at least a part of the measurement information, or transmitting the one or more commands.

14. A non-transitory computer readable medium comprising program instructions which, when executed by an apparatus, cause the apparatus to perform at least the following:

transmitting measurement information to a near-real-time radio intelligent controller, wherein the measurement information comprises at least one of the following: status metrics or performance metrics associated with cell site auxiliary equipment;

receiving, from the near-real-time radio intelligent controller, one or more commands for controlling one or more functions of the cell site auxiliary equipment, wherein the one or more commands indicate to charge or discharge one or more batteries of the cell site auxiliary equipment according to a determined time and energy amount for charging or discharging the one or more batteries, wherein an E2 interface is used for at least one of the following: transmitting at least a part of the measurement information, or receiving the one or more commands; and applying the one or more commands for controlling the one or more functions of the cell site auxiliary equipment.

* * * * *